(12) United States Patent
Miyawaki et al.

(10) Patent No.: US 8,562,850 B2
(45) Date of Patent: Oct. 22, 2013

(54) EMULSION FOR VIBRATION DAMPING MATERIALS

(75) Inventors: Yukihiro Miyawaki, Suita (JP); Kazutaka Otsuki, Suita (JP); Dai Nagaishi, Suita (JP); Takahiro Miwa, Suita (JP)

(73) Assignee: Nippon Shokubai Co., Ltd., Osaka (JP)

( * ) Notice: Subject to any disclaimer, the term of this patent is extended or adjusted under 35 U.S.C. 154(b) by 7 days.

(21) Appl. No.: 12/057,928

(22) Filed: Mar. 28, 2008

(65) Prior Publication Data

US 2008/0245989 A1 Oct. 9, 2008

(30) Foreign Application Priority Data

| Mar. 30, 2007 | (JP) | 2007-095238 |
| Mar. 30, 2007 | (JP) | 2007-095239 |
| Mar. 30, 2007 | (JP) | 2007-095240 |
| Nov. 2, 2007 | (JP) | 2007-286383 |
| Nov. 2, 2007 | (JP) | 2007-286385 |
| Nov. 5, 2007 | (JP) | 2007-287294 |

(51) Int. Cl.
   *E04B 1/82* (2006.01)
   *C08L 33/06* (2006.01)

(52) U.S. Cl.
   USPC ......... 252/62; 524/800; 524/803; 524/804; 524/824; 524/833

(58) Field of Classification Search
   USPC ............ 524/800, 804, 824, 833; 252/62
   See application file for complete search history.

(56) References Cited

U.S. PATENT DOCUMENTS

| 5,356,956 | A | 10/1994 | Uemae et al. | |
| 5,405,879 | A | 4/1995 | Uemae et al. | |
| 7,176,258 | B2 | 2/2007 | Morihiro et al. | |
| 2003/0207990 | A1* | 11/2003 | Morihiro et al. | 524/832 |
| 2004/0072943 | A1 | 4/2004 | Morihiro et al. | |
| 2005/0101697 | A1* | 5/2005 | Morihiro et al. | 523/201 |
| 2006/0106142 | A1* | 5/2006 | Kim et al. | 524/261 |
| 2006/0189734 | A1 | 8/2006 | Gota et al. | |
| 2007/0049697 | A1* | 3/2007 | Miyawaki et al. | 525/320 |

FOREIGN PATENT DOCUMENTS

| CN | 1624015 A | 6/2005 |
| EP | 0609756 A2 | 8/1994 |
| EP | 1520865 A2 | 4/2005 |
| EP | 1930388 A1 | 6/2008 |
| EP | 1930390 A1 | 6/2008 |
| EP | 1935941 A1 | 6/2008 |
| JP | 2904995 | 6/1993 |
| JP | 09-104842 | 4/1997 |
| JP | 10-324822 A | 12/1998 |
| JP | 11-029737 | 2/1999 |
| JP | 2000-178497 | 6/2000 |
| JP | 2000-178498 | 6/2000 |
| JP | 2000-178499 | 6/2000 |
| JP | 2004-137485 A | 5/2004 |
| JP | 2004-277603 | 10/2004 |
| JP | 2005-105106 A | 4/2005 |
| JP | 2005105133 | 4/2005 |
| JP | 2005-187514 A | 7/2005 |
| JP | 2005-281577 | 10/2005 |
| JP | 2006-257395 | 9/2006 |
| JP | 2006335938 | 12/2006 |
| WO | WO 2007/023821 | * 3/2007 |
| WO | WO-2007023821 | 3/2007 |

OTHER PUBLICATIONS

Aldirch Reference "Polymer Properties" Data sheet. No Author, No Date. Available from www.aldrich.com.*
San Esters Corporation Data Sheet. Obtained online from www.sanesters.com/download/SEC-Presentation.ppt. No Author, No Date.*
Extended European Search Report dated Oct. 29, 2010 issued in counterpart European Application No. 08739062.1.

* cited by examiner

*Primary Examiner* — Liam Heincer
*Assistant Examiner* — Michael A Salvitti
(74) *Attorney, Agent, or Firm* — Novak Druce Connolly Bove + Quigg LLP

(57) ABSTRACT

The present invention relates to an emulsion for vibration damping materials, including an emulsion obtainable by emulsion polymerization of a monomer component, wherein the emulsion is obtainable by emulsion polymerization using an anionic emulsifier and/or a reactive emulsifier, and emulsion particles have an average particle diameter of 100 to 450 nm, and an emulsion for vibration damping materials, comprising acrylic emulsion particles each having a core part and a shell part, wherein the acrylic emulsion particles are obtainable by polymerizing a monomer component including a monomer having a Q value of 0.6 to 1.4 and an e value of −0.4 to −1.2.

24 Claims, No Drawings

EMULSION FOR VIBRATION DAMPING MATERIALS

This application claims priority Under 35 USC 119 from Japanese applications 2007-095238, filed Mar. 30, 2007; 2007-095239 filed Mar. 30, 2007; 2007-095240, filed Mar. 30, 2007; 2007-286383, filed Nov. 2, 2007; 2007-286385, filed Nov. 2, 2007; and 2007-287294, filed Nov. 5, 2007; the entire contents of all are hereby incorporated by reference.

TECHNICAL FIELD

The present invention relates to an emulsion for vibration damping materials. More preferably, the present invention relates to an emulsion for vibration damping materials useful as a raw material for vibration damping materials used to prevent vibration and noise of various structures, thereby to insure sustained quietude.

BACKGROUND ART

Vibration damping materials are used to prevent vibration and noise of various structures to insure sustained quietude. The vibration damping materials have been widely used beneath cabin floors of automobiles or applied to rolling stock, ships, aircraft, electric machines, buildings, construction machines, and the like. Molded products such as plate products and sheet products produced using materials having vibration absorbing performance and sound absorbing performance have been conventionally used as raw materials used for such vibration damping materials. However, it is difficult for such molded products to be used at vibration- or noise-generation positions having complicated shapes. Therefore, various methods for improving the workability and thereby sufficiently exhibiting the vibration damping property have been investigated. That is, an inorganic powder-containing asphalt sheet has been installed beneath cabin floors of automobiles, for instance, but since the sheet must be secured in position by thermal fusion, improvements in workability and the like are needed. Therefore, studies on various compositions or polymers for vibration damping for forming the vibration damping materials have been made.

Coating vibration damping materials (coating materials) have been developed as an alternative material for such molded products. For example, the following vibration damping coating material has been variously proposed: a vibration damping coating material is sprayed onto positions to be subjected to damping treatment with a spray or applied thereto by any method, and the thus-formed coating film can give a vibration absorbing effect and a sound absorbing effect. Specifically, an aqueous vibration damping coating material prepared by the following manners: mixing synthetic resin powders with a vehicle such as asphalt, rubber, and synthetic resin; and improving the hardness of the obtained coating film, has been developed. In addition, as materials suitably used for interior parts of cars, vibration damping coating materials prepared by dispersing activated carbon as a filler into a resin emulsion has been developed. Such vibration damping coating materials and the like need to be excellent in vibration damping property and mechanical stability. However, these conventional items are still insufficient in vibration damping performances. Therefore, a technology which enables vibration damping materials to exhibit more sufficient vibration damping performances in addition to excellent mechanical stability has been desired. If the vibration damping coating material is formed on an object, the coating material is dried by heating at a high temperature, for example, by baking, in an industrially used drying line. If a conventional emulsion for vibration damping materials is coated on a vertical or inclined surface, the coating material on the coating surface sags during or after the heating in some cases. Therefore, an emulsion for vibration damping materials, which shows the following excellent resistance to coating film collapsibility has been needed: the coating film does not collapse, for example, it does not sag, even when it is dried by heating in an industrially used drying line; and an excellent coating film can be formed on the vertical or inclined surface. Further, such a vibration damping coating material is stored and used in cold regions. Therefore, a vibration damping coating material which is excellent in low-temperature storage stability in order to maintain its usable state without freezing and the like under low temperatures also has been desired.

With respect to a conventional raw material for vibration damping materials, Japanese Kokai Publication No. 2004-137485 on pages 1 and 2 discloses a thickener for aqueous vibration damping materials, including a polymer containing an alkali-soluble monomer unit and an associative monomer unit. A coating material containing this thickener for aqueous vibration damping materials is excellent in drying property and can sufficiently prevent cracks or blisters generated on the surface, and thereby high-quality vibration damping materials excellent in vibration damping property can be provided. Therefore, such a coating material has been industrially useful. However, such a thickener for aqueous vibration damping materials has room for improvement in order to be more preferably used as a raw material for vibration damping materials of various structures by further improving the physical properties such as vibration damping property, drying property, and mechanical stability.

Further, Japanese Kokai Publication No. 2006-257395 on pages 1, 2, 12, and 13 discloses an emulsion composition containing a synthetic resin and an nonionic compound which is prepared by adding an ethylene oxide and an alkylene oxide containing 3 or more carbon atoms randomly and/or in block to an aliphatic alcohol containing 18 carbon atoms or less and which has a specific molecular weight. Japanese Kokai Publication No. 2006-257395 discloses that this composition does not sag under drying at a high temperature, but the coating film having a thickness of as small as 25 μm is subjected to the liquid dripping test. Therefore, there is room for improvement in order to form a composition capable of forming a coating film which does not sag even if the film has a large thickness.

Further, Japanese Kokai Publication No. 2005-105106 on pages 1 and 2 discloses an emulsion for vibration damping materials, including a polymer and an emulsifier. Such an emulsion contains 3% by weight or less of a nonionic emulsifier as the emulsifier relative to the total amount of the monomers used for forming the polymer. This composition can form a coating film which neither sags nor drops, but such a composition still has room for improvement in order to more effectively exhibit these effects.

As a conventional composition for vibration damping materials, which forms a vibration damping material, the following emulsion-containing copolymer latexes are disclosed. Japanese Kokai Publication No. Hei-09-104842 on pages 1 and 2 discloses an aqueous damping coating composition including at least one vehicle selected from a synthetic resin emulsion and an asphalt emulsion. Japanese Kokai Publication No. Hei-11-29737 on pages 1 and 2 discloses a copolymer latex for aqueous coating, obtained by copolymerizing an aliphatic conjugated diene monomer, an ethylene unsaturated carboxylic acid monomer, and the like, in the presence of an α-methylstyrene dimer. Japanese Kokai Publication No. 2000-178497 on pages 1 and 2 discloses a copolymer latex for chipping-resistant coating material, obtained by subjecting a conjugated diene monomer, an ethylene unsaturated carboxylic acid amide monomer, an ethylene unsaturated carboxylic acid monomer, and the like to emulsion polymerization in the presence of an inorganic persulfate polymerization initiator. Japanese Kokai Publication No. 2000-178498 on pages 1 and 2 discloses a copolymer latex for vibration damping material, obtained by subjecting a conjugated diene monomer, an epoxy group-containing ethylene unsaturated monomer, an ethylene unsaturated carboxylic acid alkyl ester monomer, and the like, to emulsion polymerization. Japanese Kokai Publication No. 2000-178499 on pages 1 and 2 discloses a copolymer latex for vibration damping material, obtained by subjecting a conjugated diene monomer, an epoxy group-containing ethylene unsaturated monomer, an ethylene unsaturated carboxylic acid amide monomer, and the like to emulsion polymerization.

However, these technologies fail to provide a vibration damping material which can attain both excellent thermal drying property and excellent vibration damping property. That is, in the case where the synthetic resin emulsion or the asphalt emulsion is used, blisters tend to be generated on the coating film surface when the coating film is formed by thermal drying because moisture in an undried coating film tries to evaporate. Therefore, there is room for improvement in the thermal drying property. Further, if a copolymer latex composed of a conjugated diene monomer and other monomers is used, the monomer unit derived from the conjugated diene monomer does not exhibit sufficient vibration damping property. Therefore, such a copolymer latex still has room for improvement in order to satisfy excellent thermal drying property and vibration damping property.

With regard to an aqueous dispersion containing acrylic polymer particles that are composite particles each composed of a core part and a shell part, Japanese Patent No. 2904995 on pages 1 to 3 discloses that such an aqueous dispersion can be prepared using a reactive anionic surfactant and that the thus-obtained aqueous dispersion is preferably used to form a chipping material. Such an aqueous dispersant is preferably used to form a chipping material and it can form a hard coating film which is hardly scarred. Such a coating film property is emphasized and therefore, in order to be spray-coated, such an aqueous dispersant is determined to have a low viscosity. However, with regard to vibration damping materials, it is preferable that the vibration damping materials form a hard coating film, but softness of the coating film is also important. Further, the composition for vibration damping materials is prepared to have a relatively high viscosity in order to form a thick coating film. Accordingly, such a composition has room for improvement in order to be preferably used as a vibration damping composition having such characteristics, and further in order to be excellent in vibration damping property or thermal drying property and hardly changed with time.

Japanese Kokai Publication No. 2004-277603 on pages 1 and 2 discloses an emulsion for vibration damping materials, including an emulsion obtainable by emulsion polymerization of a monomer component using a reactive emulsifier. This emulsion for vibration damping materials is excellent in characteristics such as vibration damping property and thermal drying property. However, such an emulsion still has room for improvement in order to be directly coated not only on a horizontal surface but also on an inclined surface and then dried, thereby forming a coating film which exhibits high vibration damping property.

As the resin emulsion used in the vibration damping material application, an acrylic emulsion having a core-shell structure and the like has been used. However, the acrylic emulsion delays a polymerization reaction when a polymer is produced, and due to this, mixing of the monomer constituent of core part and that of shell part is caused, resulting in insufficient localization. The polymer in which the localization of the monomer components is insufficient does not exhibit high vibration damping property. Therefore, in order to obtain a polymer which exhibits high vibration damping property by preventing such delay of the polymerization reaction, a method of introducing (meth)acrylic acid ester such as methyl methacrylate into a polymer has been used. However, according to this method, production costs are increased. Therefore, a method for more inexpensively producing an acrylic emulsion in which the mixing of the monomer constituent of core part and that of shell part is not generated has been needed.

With regard to a conventional emulsion for vibration damping materials, Japanese Kokai Publication No. 2005-281577 on pages 1 and 2 discloses a copolymer emulsion for vibration damping materials, prepared by copolymerizing a monomer mixture essentially containing an acrylic monomer. However, this copolymer emulsion for vibration damping materials is produced from a monomer mixture containing 25% by weight or more of methyl methacrylate. Therefore, there is still room for improvement in that a copolymer emulsion which exhibits high vibration damping property or mechanical stability and also exhibits excellent low-temperature storage stability and in which mixing of the monomer constituent of core part and that of shell part is not generated is produced more inexpensively.

Japanese Kokai Publication No. 2005-187514 on pages 1 and 2 discloses a vibration-damping water-based coating composition including: an urea compound; a filler; and a foaming agent; and a synthetic resin emulsion essentially including an α,β-unsaturated carboxylic acid and at least one monomer selected from α,β-unsaturated carboxylic acid ester monomers, aromatic vinyl monomers, and diene monomers, in which the glass transition temperature (Tg), the maximum value of the loss angle tangent, and the average particle diameter are specified. Further, Japanese Kokai Publication No. Hei-10-324822 on pages 1 and 2 discloses a vibration-damping water-based coating composition essentially containing a filler and a resin emulsion in which the Tg, the loss angle tangent, and the average particle diameter of the resin particles are specified. However, these compositions also have room for improvement in order to exhibit more excellent vibration damping property or mechanical stability, and have excellent low-temperature storage stability.

SUMMARY OF THE INVENTION

The present invention has been made in view of the above-mentioned state of the art. The present invention has an object to provide at least one of the following (1) to (3).

(1) To provide the following emulsion for vibration damping materials: it is excellent in vibration damping property, drying property, and mechanical stability; it can improve skinning property of the coating film surface; and it can form an excellent coating film which hardly collapses, for example, hardly sags, even if the emulsion is coated on the vertical surface and dried by heating at a high temperature.

(2) To provide the following emulsion for vibration damping materials: it is excellent in vibration damping property and thermal drying property; it is hardly changed with time; it can improve the stability or dispersibility of the composition; and it can form a coating film exhibiting excellent vibration damping property even if the emulsion is coated on an inclined object.

(3) To provide the following emulsion for vibration damping materials: it includes acrylic emulsion particles each having a core part and a shell part and exhibits high vibration damping property in a wide temperature region; it is excellent in mechanical stability; and it is also excellent in storage stability at a low temperature.

The present inventor found that if the emulsion for vibration damping materials contains an emulsion (emulsion polymer) and an anionic emulsifier, the emulsion can obtain improved stability, attributed to a balance between a hydrophobic group and a hydrophilic group in the structure of the anionic emulsifier. Further, if the emulsion particles are controlled to have a particle size within a specific range, the mechanical stability or the pigment dispersibility is dramatically improved and the emulsion obtains excellent vibration damping property or drying property in a wide temperature range, and further, the skinning property of the coating film surface as a vibration damping material, can be improved, and even if such an emulsion is coated on a vertical surface and the coating film is dried by heating at a high temperature, the obtained coating film does not drop. Therefore, such an emulsion has excellent resistance to coating film collapsibility.

In addition, the present invention found that if the emulsion is prepared by emulsion polymerization of a monomer component using a reactive emulsifier, the emulsion exhibits excellent thermal drying property because the emulsifier is hardly liberated into water; the emulsion is hardly changed with time because the emulsifier is hardly liberated with times; and the mechanical stability of the emulsion is improved because the emulsifier is chemically bonded to the emulsion. Further, in such an emulsion, if the emulsion particles are controlled to have a particle size within a specific range, such an emulsion can form an excellent coating film even on a non-horizontal surface by being uniformly coated and dried. Therefore, such an emulsion can form a coating film excellent in vibration damping property and mechanical stability even on an inclined surface, and therefore, such an emulsion shows an excellent thermal drying property on the inclined surface.

Further, the present inventor noted that if the emulsion for vibration damping materials contains acrylic emulsion particles each having a core part and a shell part, the emulsion can exhibit excellent vibration damping property in a wide temperature region in comparison with the case where an acrylic copolymer is singly used or two or more difference acrylic copolymers are mixed. Then, the inventor made various investigations on an acrylic emulsion having a core-shell structure, which exhibits excellent characteristics such as high vibration damping property and mechanical stability. As a result, the inventor found that if an emulsion is prepared using a monomer component essentially including a monomer having specific Q and e values, the mixing of the monomer constituent of core part and that of shell part in the core-shell structure can be suppressed. If the use amount of the monomer having a relatively higher Tg than that of other monomer components, which is generally added to prevent mixing of the monomer constituent of core part and that of shell part, is decreased, an acrylic emulsion having a core-shell structure in which the mixing of the monomer constituent of core part and that of shell part is sufficiently suppressed is formed. As a result, an acrylic emulsion having a core-shell structure in which the mixing of the monomer constituent of core part and that of shell part is not generated can be produced more inexpensively in comparison to conventional production methods. In addition, the thus-obtained acrylic emulsion exhibits higher vibration damping property and excellent mechanical stability in a wide temperature range, and also in a low temperature region, the emulsion can maintain its usable state without being frozen or separated and exhibits excellent low-temperature storage stability, in a vibration damping material application. As a result, the above-mentioned problems had been admirably solved, leading to completion of the present invention.

That is, the present invention relates to an emulsion for vibration damping materials, including an emulsion obtainable by emulsion polymerization of a monomer component, wherein the emulsion is obtainable by emulsion polymerization using an anionic emulsifier and/or a reactive emulsifier, and emulsion particles have an average particle diameter of 100 to 450 nm.

The present invention also relates to an emulsion for vibration damping materials, including acrylic emulsion particles each having a core part and a shell part, wherein the acrylic emulsion particles are obtainable by polymerizing a monomer component including a monomer having a Q value of 0.6 to 1.4 and an e value of −0.4 to −1.2.

DETAILED DESCRIPTION OF THE INVENTION

The present invention is described in more detail below.

In the present description, the emulsion for vibration damping materials, including an emulsion which is obtainable by emulsion polymerization using an anionic emulsifier and/or a reactive emulsifier and which includes emulsion particles having an average particle diameter of 100 to 450 nm, is referred to as an emulsion for vibration damping materials (1) of the present invention. The emulsion for vibration damping materials (1) of the present invention includes an emulsion for vibration damping materials (1A), including an emulsion which is obtainable by emulsion polymerization using an anionic emulsifier and includes emulsion particles having an average particle diameter of 100 to 450 nm; an emulsion for vibration damping materials (1B), including an emulsion which is obtainable by emulsion polymerization using a reactive emulsifier and which includes emulsion particles having an average particle diameter of 100 to 450 nm; and an emulsion for vibration damping materials (1C), including an emulsion which is obtainable by emulsion polymerization using an anionic emulsifier and a reactive emulsifier and which includes emulsion particles having an average particle diameter of 100 to 450 nm. The emulsion for vibration damping materials (1C) of the present invention obtainable using an anionic emulsifier and a reactive emulsifier means an embodiment in which at least one emulsifier which belongs to both of the anionic emulsifier and the reactive emulsifier is used; or an embodiment in which at least one emulsifier which belongs to the anionic emulsifier and at least one emulsifier which belongs to the reactive emulsifier are used. It is preferable that the emulsion for vibration damping materials (1C) of the present invention has an embodiment in which at least one emulsifier which belongs to both of the anionic emulsifier and the reactive emulsifier is used.

Further, the emulsion for vibration damping materials, including acrylic emulsion particles each having a core part and a shell part, wherein the acrylic emulsion particles are obtainable by polymerizing a monomer component essentially including a monomer having a Q value of 0.6 to 1.4 and an e value of −0.4 to −1.2 is referred to as an emulsion for vibration damping materials (2) of the present invention.

The emulsion for vibration damping materials of the present invention satisfies at least one of the embodiments (1A), (1B), (1C), and (2). However, it is preferable that the emulsion for vibration damping materials of the present invention simultaneously satisfies (2) and any of (1A), (1B), and (1C). Such an emulsion for vibration damping materials can exhibit both of the effect attributed to the emulsion for vibration damping materials (2) of the present invention and any one effect attributed to the emulsion for vibration materials (1A), (1B), or (1C) of the present invention. More preferably, the emulsion for vibration damping materials of the present invention simultaneously satisfies (1C) and (2).

In this description, the term "the emulsion for vibration damping materials of the present invention" includes the emulsions for vibration damping materials (1) and (2) of the present invention. That is, the contents relating to "the emulsion for vibration damping materials of the present invention" can be applied to both of the emulsions for vibration damping materials (1) and (2) of the present invention. Further, "the anionic emulsifier and/or the reactive emulsifier" means only the anionic emulsifier when the emulsion for vibration damping materials (1A) of the present invention is mentioned; it means only the reactive emulsifier when the emulsion for vibration damping materials (1B) of the present invention is mentioned; and it means the anionic emulsifier and the reactive emulsifier when the emulsion for vibration damping materials (1C) of the present invention is mentioned.

The emulsion for vibration damping materials (1) of the present invention is mentioned below.

The emulsion for vibration damping materials (1) of the present invention includes an emulsion obtainable by emulsion polymerization of a monomer component using an anionic emulsifier and/or a reactive emulsifier. The emulsion for vibration damping materials (1) of the present invention may contain one or more species of such an emulsion. The emulsion for vibration damping materials (1) of the present invention may contain other emulsions other than the emulsion obtainable by emulsion polymerization using an anionic emulsifier and/or a reactive emulsifier as long as it includes at least one emulsion obtainable by emulsion polymerization of a monomer component using an anionic emulsifier and/or a reactive emulsifier. The emulsion obtainable by emulsion polymerization of a monomer component using an anionic emulsifier and/or a reactive emulsifier preferably accounts for 50% by weight or more relative to 100% by weight of the total amount of the emulsion, and more preferably it accounts for 80% by weight or more.

Emulsion resins mentioned below and the like may be used as other emulsions.

The above-mentioned emulsion for vibration damping materials (1) is in the form of particles of a polymer obtainable by emulsion polymerization of a monomer component using an anionic emulsifier and/or a reactive emulsifier, and the particles are dispersed into a medium. An aqueous medium is preferable as the medium. Examples of such an aqueous medium include water and mixed solvents of water and a water-miscible solvent. Among these, water is preferred in view of influence on environment or safety, which may be caused by use of a coating material containing the emulsion for vibration damping materials (1) of the present invention.

It is preferable that the nonvolatile content in the above-mentioned emulsion for vibration damping materials (1), that is, the content of particles of the emulsion obtainable by emulsion polymerization of a monomer component using an anionic emulsifier and/or a reactive emulsifier is 30% by weight or more and 70% by weight or less relative to 100% by weight of the total amount of the emulsion for vibration damping materials (1). If the content is more than 70% by weight, the viscosity of the emulsion for vibration damping materials (1) becomes too high, and thereby, the emulsion may not maintain sufficient dispersion stability and then aggregate. If the content is less than 30% by weight, sufficient vibration damping property might not be exhibited. The content is more preferably 50% by weight or more and 65% by weight or less.

If the emulsion for vibration damping materials (1) includes other emulsions other than the emulsion obtainable by emulsion polymerization of a monomer component using an anionic emulsifier and/or a reactive emulsifier, it is preferable that the nonvolatile content in the entire emulsion for vibration damping materials (1) of the present invention, including the emulsion obtainable by emulsion polymerization of a monomer component using an anionic emulsifier and/or a reactive emulsifier and other emulsions, satisfies the above-mentioned value.

According to the emulsion for vibration damping materials (1) of the present invention, particles of the emulsion obtainable by emulsion polymerization using an anionic emulsifier and/or a reactive emulsifier have an average particle diameter of 100 to 450 nm.

If the emulsion particles having an average particle diameter within this range are used, the obtained coating film does not sag after being dried by heating, and it has an excellent resistance to coating film collapsibility. Therefore, such an emulsion can form a coating film which exhibits high vibration damping property and mechanical stability even on the vertical surface.

The average particle diameter of the emulsion particles is preferably 120 to 400 nm, and more preferably 150 to 350 nm. If the average particle diameter of the emulsion particles is within such a range, the operation and effects of the emulsion for vibration damping materials (1) of the present invention are more effectively exhibited.

If the emulsion for vibration damping materials (1) of the present invention includes the emulsion obtainable by emulsion polymerization of a monomer component using an anionic emulsifier and/or a reactive emulsifier and other emulsions, it is preferable that the emulsion including both these emulsions has an average particle diameter of 100 to 450 nm. That is, it is preferable that the entire emulsion for vibration damping materials (1) of the present invention has an average particle diameter within the above-mentioned range.

The average particle diameter can be measured by the following procedures, for example. The emulsion is diluted with distilled water and then sufficiently stirred and mixed. Then, about 10 mL of the mixture is charged into a glass cell and subjected to measurement by a dynamic light scattering method using a particle size distribution analyzer ("NICOMP Model 380", product of Particle Sizing Systems).

In the emulsion for vibration damping materials (1) of the present invention, it is preferable that the emulsion particles having the above-mentioned average particle diameter has a particle size distribution of 40% or less. The particle size distribution is defined as a value obtained by dividing a standard deviation by a volume average particle diameter thereof (standard deviation/volume average particle diameter×100). More preferably, it has a particle size distribution of 30% or less. If the particle size distribution is more than 40%, the particle size distribution of the emulsion particles becomes very wide, and the emulsion partly contains coarse particles. Therefore, due to influence of such coarse particles, the emulsion for vibration damping materials might not exhibit sufficient coating film drying property on an inclined surface.

The emulsifier used for producing the above-mentioned emulsion for vibration damping materials (1) may contain an emulsifier other than an anionic emulsifier and a reactive emulsifier as long as it contains an anionic emulsifier and/or a reactive emulsifier. However, it is preferable that the emulsifier contains an anionic emulsifier and/or a reactive emulsifier as a main component. More preferably, the emulsifier contains only an anionic emulsifier and/or a reactive emulsifier. If an anionic emulsifier and/or a reactive emulsifier are/is used as the emulsifier, blisters which are generated by heat at the time of drying because the emulsifier is liberated into water and bleeds to the coating film surface, are suppressed. Further, the stability and dispersibility of the emulsion can be improved, and thereby the vibration damping property can be improved.

It is preferable that the emulsion for vibration damping materials (1) of the present invention contains 1.0 part by weight or more of an anionic emulsifier and/or a reactive emulsifier, relative to 100 parts by weight of the total amount of the monomer component used for producing the emulsion obtainable by emulsion polymerization of a monomer component using an anionic emulsifier and/or a reactive emulsifier. If the content is less than 1.0 part by weight, excellent drying property and vibration damping property can not be exhibited. Further, if the emulsion is mixed with a pigment, they might not be sufficiently mixed with each other. The emulsion might be not useful for vibration damping materials of various structures for their reasons. The content is preferably 2.0 parts by weight or more and more preferably 2.5 parts by weight or more. The content is also preferably 5.0 parts by weight or less in view of economic efficiency.

If both of the anionic emulsifier and the reactive emulsifier are used, it is preferable that the total amount thereof satisfies the above-mentioned range.

It is preferable that the anionic emulsifier used in the above-mentioned emulsion for vibration damping materials (1) is a sulfate compound or a succinate compound, and the sulfate compound contains at least one selected from the group consisting of aliphatic alkyl groups containing 8 or more carbon atoms, oleyl groups, alkyl phenyl groups, styryl groups, and benzyl groups. More preferable examples of the aliphatic alkyl groups containing 8 or more carbon atoms include aliphatic alkyl groups containing 12 or more carbon atoms and aliphatic alkyl groups containing one or more aromatic rings.

Among these, it is preferable that the anionic emulsifier is at least one selected from the group consisting of polyoxyalkylene alkyl ether sulfate, polyoxyalkylene oleyl ether sodium sulfate, polyoxyalkylene alkylphenyl ether sulfate, alkyl diphenyl ether disulfonate, polyoxyalkylene (mono, di, tri)styryl phenyl ether sulfate, polyoxyalkylene (mono, di, tri)benzyl phenyl ether sulfate, and alkenyl disuccinate.

These anionic emulsifiers each exhibit the same effects because each has a skeleton with strong hydrophobicity. Use of these anionic emulsifiers enables the emulsion for vibration damping materials (1) of the present invention to more effectively exhibit the characteristics. The polyoxyalkylene (mono, di, tri)styryl phenyl ether sulfate means any one of polyoxyalkylene monostyryl phenyl ether sulfate, polyoxyalkylene distyryl phenyl ether sulfate, and polyoxyalkylene tristyryl phenyl ether sulfate. The polyoxyalkylene (mono, di, tri)benzylphenyl ether sulfate means any one of polyoxyalkylene monobenzyl phenyl ether sulfate, polyoxyalkylene dibenzyl phenyl ether sulfate, and polyoxyalkylene tribenzyl phenyl ether sulfate.

Among the above-mentioned compounds, the anionic emulsifier used in the above-mentioned emulsion for vibration damping materials (1) is preferably at least one selected from the group consisting of: polyoxyethylene alkyl ether sulfates having an ethylene oxide chain in which an average molar number of addition of ethylene oxide is 15 to 35, polyoxyethylene alkyl phenyl ether sodium sulfates, polyoxyethylene (mono, di, tri)styryl phenyl ether sulfates, and polyoxyethylene (mono, di, tri)benzyl phenyl ether sulfates.

Particularly preferable compounds as these anionic emulsifiers are mentioned as follows: LATEMUL WX, LATEMUL 118B, PELEX SS-H, EMULGEN 1118S, EMULGEN A-60, B-66 (products of Kao Corp.), NEWCOL 707SF, NEWCOL 707SN, NEWCOL 714SF, NEWCOL 714SN, ANTOX MS-60 (products of Nippon Nyukazai Co., Ltd.), AB-26S, ABEX-2010, 2020 and 2030, DSB (products of Rhodia Nikka Co., Ltd.), and ADEKA-REASOAP SR-10, SR-20, SR-30 (products of ADEKA). Further, surfactants which are nonionic type of these emulsifiers may be also used. Among these, LATEMUL WX is most preferably used as an anionic emulsifier not belonging to a reactive emulsifier.

In the above-mentioned emulsion for vibration damping materials (1), at least one of the above-mentioned anionic emulsifiers is used together with other commonly used anionic emulsifiers. Such an anionic emulsifier is not especially limited. Examples of the anionic emulsifier include alkyl sulfates such as sodium dodecyl sulfate, potassium dodecyl sulfate, and ammonium alkyl sulfate; sodium dodecyl polyglycol ether sulfate; sodium sulforicinoate; alkyl sulfonates such as sulfonated paraffin salt; alkyl sulfonates such as sodium dodecylbenzene sulfonate, and alkali metal sulfates of alkali phenol hydroxyethylene; higher alkyl naphthalene sulfonates; naphthalene sulfonate-formalin condensates; fatty acid salts such as sodium laurate, triethanol amine oleate, and triethanol amine abietate; polyoxyalkyl ether sulfates; polyoxyethylene carboxylic acid ester sulfates; polyoxyethylene phenyl ether sulfates; succinic acid dialkyl ester sulfonates; and polyoxyethylenealkylaryl sulfates. One or more species of them may be preferably used.

Reactive emulsifiers are preferably used as the above-mentioned anionic emulsifier. Preferred examples of such reactive emulsifiers include reactive anionic surfactants, sulfosuccinate reactive anionic surfactants, and alkenyl succinate reactive anionic surfactants. One or more species of them may be used.

LATEMUL S-120, S-120A, S-180 and S-180A (trade name, products of Kao Corp.), ELEMINOL JS-2 (trade name, product of Sanyo Chemical Industries, Ltd.), and the like, are mentioned as commercial items of the sulfosuccinate reactive anionic surfactant. LATEMUL ASK (trade name, product of Kao Corp.) is mentioned as a commercial item of the alkenyl succinate reactive anionic surfactant.

The following surfactants which serve as a reactive emulsifier are preferably used as the above-mentioned anionic emulsifier. $C_3$ to $C_5$ aliphatic unsaturated carboxylic acid sulfoalkyl (containing 1 to 4 carbon atoms) ester surfactants, for example, (meth)acrylic acid sulfoalkyl ester salt surfactants such as 2-sulfoethyl (meth)acrylate sodium salt and 3-sulfopropyl (meth)acrylate ammonium salt; and aliphatic unsaturated dicarboxylic acid alkyl sulfoalkyl diester salt surfactants such as sulfopropylmaleic acid alkyl ester sodium salt, sulfopropylmaleic acid polyoxyethylene alkyl ester ammonium salt and sulfoethylfumaric acid polyoxyethylene alkyl ester ammonium salt;

maleic acid dipolyethylene glycol ester alkylphenol ether sulfates; phthalic acid dihydroxyethyl ester (meth)acrylate sulfates; 1-allyloxy-3-alkyl phenoxy-2-polyoxyethylene sulfates (trade name: ADEKA REASOAP SE-10N, product of ADEKA Corp.), and polyoxyethylene alkylalkenylphenol sulfates (trade name: AQUALON, product of DAI-ICHI KOGYO SEIYAKU CO., LTD.).

Polymerizable group-containing anionic emulsifiers, polymerizable group-containing nonionic emulsifiers and the like are preferable as the reactive emulsifier contained in the above-mentioned emulsion for vibration damping materials (1). One or more species of them may be used. Among these, an emulsifier containing a polymerizable group such as a vinyl group, allyl group, a (meth)acryloyl group and a propenyl group is preferable.

As the above-mentioned polymerizable group-containing anionic emulsifiers used for producing the emulsion for vibration damping materials (1) of the present invention, in addition to the above-mentioned specific examples of the anionic emulsifier, allyl group-containing sulfates (salts) such as (meth)acrylic acid polyoxyethylene sulfonate (for example, "ELEMINOL RS-30", product of Sanyo Chemical Industries, Ltd.), allyloxymethyl alkyloxy polyoxyethylene sulfonate (for example, "AQUALON KH-10" by DAI-ICHI KOGYO SEIYAKU CO., LTD.), and polyoxyalkylene alkenyl ether ammonium sulfate (for example, "LATEMUL PD-104", product of Kao Corp.) are preferable.

Preferable examples of the above-mentioned polymerizable group-containing nonionic emulsifier used for producing the emulsion for vibration damping materials (1) of the present invention include: allyloxymethyl alkoxy ethyl hydroxy polyoxyethylene (for example, "ADEKA-REASOAP ER-20", product of ADEKA Corp.); and polyoxyalkylene alkenyl ether (for example, "LATEMUL PD-420" and "LATEMUL PD-430", products of Kao Corp.).

Among the above-mentioned reactive emulsifiers, ANTOX MS-60 (trade name, product of Nippon Nyukazai Co., Ltd.), ADEKA-REASOAP SR-10, SR-20, and SR-30 (trade name, products of ADEKA Corp.), AQUALON KH-10 (trade name, product of DAI-ICHI KOGYO SEIYAKU CO., LTD.), LATEMUL PD-104 (trade name, product of Kao Corp.) are particularly preferable as the reactive emulsifier used for producing the emulsion for vibration damping materials (1) of the present invention. If the emulsion obtained using these reactive emulsifiers is used, the characteristics of the emulsion for vibration damping materials of the present invention can be more effectively exhibited.

Among the above-mentioned reactive emulsifiers, it is preferable that a reactive emulsifier having an addition structure of ethylene oxide is used because the emulsion for vibration damping materials becomes excellent in mixing property with a pigment, a filler, and the like. A stability of the emulsion for vibration damping materials to a pigment, a filler, and the like might be improved due to an addition of the structure of ethylene oxide.

In the emulsion for vibration damping materials (1) of the present invention, the use amount of the reactive emulsifier is 0.1 to 10% by weight relative to the total use amount of polymerizable unsaturated bond-containing compounds. If the use amount is less than 0.1% by weight, the mechanical stability might be insufficiently improved and further sufficient polymerization stability might not be maintained. The use amount is more preferably 0.5 to 5% by weight and most preferably 1 to 3% by weight.

The emulsion constituting the emulsion for vibration damping materials (1) of the present invention is mentioned below.

A commonly used emulsion may be used as the emulsion constituting the emulsion for vibration damping materials (1) of the present invention. An emulsion containing one or more different polymers is preferably used.

Such a polymer exists in the form of particles dispersed into a medium, generally. That is, it is preferable that the above-mentioned emulsion contains a medium and the polymer dispersed into the medium. The medium is preferably an aqueous medium. Examples of such an aqueous medium include water; a mixture solvent composed of one or more water-miscible solvents; and a mixture solvent containing water as a main component and such solvents. Among these, water is preferred in view of influence on environment or safety, which may be caused by use of a coating material containing the emulsion for vibration damping materials of the present invention.

The monomer component as a starting material for the emulsion constituting the emulsion for vibration damping materials (1) of the present invention is not especially limited as long as it exhibits the operation and effects of the present invention. It is preferable that the monomer component contains an unsaturated carboxylic acid monomer. More preferably, the monomer component contains an unsaturated carboxylic acid monomer and other monomers copolymerizable with the unsaturated carboxylic acid monomer. The unsaturated carboxylic acid monomer is not especially limited as long as it is a compound containing an unsaturated bond and a carboxyl group in the molecule or its derivative such as a salt or an ester. It is preferable that the unsaturated carboxylic acid monomer contains an ethylenically unsaturated carboxylic acid monomer. That is, the preferable embodiments of the present invention include an emulsion for vibration damping material, including an emulsion obtainable by polymerizing a monomer component essentially containing an ethylenically unsaturated carboxylic acid monomer.

Further, if particles of the emulsion of the present invention are emulsion particles each having a core part and a shell part, the unsaturated carboxylic acid monomer and the other monomers copolymerizable with the unsaturated carboxylic acid monomer may be contained in one or both of the monomer component forming the core part of the emulsion and the monomer component forming the shell part of the emulsion.

The above-mentioned ethylenically unsaturated carboxylic acid monomer is not especially limited. Examples thereof include unsaturated carboxylic acids such as (meth)acrylic acid, crotonic acid, itaconic acid, fumaric acid, maleic acid, monomethyl fumarate, monoethyl fumarate, monomethyl maleate, and monoethyl maleate, and derivatives thereof. One or more species of them may be used.

Among these, a (meth)acrylic monomer is preferable. The (meth)acrylic monomer means (meth)acrylic acid and derivatives of (meth)acrylic acid such as a salt and an ester thereof.

That is, it is preferable that the emulsion constituting the emulsion for vibration damping materials (1) of the present invention is an acrylic copolymer.

In the present invention, the "acrylic copolymer" means a copolymer obtainable using two or more different monomer components, and at least one of the monomer components is a (meth)acrylic monomer. Among these, it is preferable that the acrylic copolymer is obtainable using a monomer component including a (meth)acrylic acid monomer. The (meth)acrylic acid monomer means (meth)acrylic acid and its salt. That is, it is preferable that the acrylic copolymer of the present invention is obtainable using monomer components including at least one monomer represented by $C(R^1_2)=CH-COOR^2$ or $C(R^3_2)=C(CH_3)-COOR^4$ where, $R^1$, $R^2$, $R^3$, and $R^4$ are the same or different and each represent a hydrogen atom, a metal atom, an ammonium group, or an organic amine group.

It is preferable that the monomer component as a starting material for the above-mentioned acrylic copolymer contains 0.1 to 20% by weight of a (meth)acrylic acid monomer and 99.9 to 80% by weight of other copolymerizable ethylenically unsaturated monomers relative to 100% by weight of the entire monomer component. If the monomer component includes a (meth)acrylic acid monomer, dispersibility of a filler such as inorganic powders is improved in a vibration damping composition essentially including the emulsion for vibration damping materials of the present invention, and the vibration damping property of the composition is more improved. Further, if the monomer component contains other copolymerizable ethylenically unsaturated monomers, an acid value, a Tg, physical properties, and the like, of the emulsion are easily adjusted. If the content of the (meth) acrylic acid monomer in the monomer component is less than 0.1% by weight or more than 20% by weight, the emulsion might not be stably prepared by the copolymerization. The emulsion in the present invention can sufficiently exhibit excellent thermal drying property and vibration damping property when it is used in an aqueous vibration damping material because of a synergistic effect of monomer units derived from these monomers.

It is more preferable that the monomer component as a starting material for the above-mentioned acrylic copolymer contains 0.5 to 3% by weight of a (meth)acrylic acid monomer and 99.5 to 97% by weight of other copolymerizable ethylenically unsaturated monomers, relative to 100% by weight of the entire monomer component.

Examples of the other copolymerizable ethylenically unsaturated monomers include (meth)acrylic monomers other than (meth)acrylic acid monomers, nitrogen atom-containing unsaturated monomers, aromatic ring-containing unsaturated compounds, and other monomers copolymerizable with (meth)acrylic acid monomers, mentioned below.

With regard to the above-mentioned monomer component as a starting material for the acrylic copolymer, examples of the (meth)acrylic acid monomer include acrylic acid, methacrylic acid, crotonic acid, citraconic acid, itaconic acid, maleic acid, maleic anhydride, and fumaric acid. One or more species of them may be preferably used. Examples of the (meth)acrylic monomers other than (meth)acrylic acid monomers include methyl acrylate, methyl methacrylate, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, pentyl acrylate, pentyl methacrylate, isoamyl acrylate, isoamyl methacrylate, hexyl acrylate, hexyl methacrylate, cyclohexyl acrylate, cyclohexyl methacrylate, octyl acrylate, octyl methacrylate, isooctyl acrylate, isooctyl methacrylate, nonyl acrylate, nonyl methacrylate, isononyl acrylate, isononyl methacrylate, decyl acrylate, decyl methacrylate, dodecyl acrylate, dodecyl methacrylate, tridecyl acrylate, tridecyl methacrylate, hexadecyl acrylate, hexadecyl methacrylate, octadecyl acrylate, octadecyl methacrylate, 2-ethylhexyl acrylate, 2-ethylhexyl methacrylate, vinyl formate, vinyl acetate, vinyl propionate, 2-hydroxyethyl acrylate, hydroxyethyl methacrylate, 2-hydroxypropyl acrylate, 2-hydroxypropyl methacrylate, diallyl phthalate, triallyl cyanurate, ethylene glycol diacrylate, ethylene glycol dimethacrylate, 1,4-butanediol diacrylate, 1,4-butanediol dimethacrylate, 1,6-hexanediol diacrylate, 1,6-hexanediol dimethacrylate, diethylene glycol diacrylate, diethylene glycol dimethacrylate, allyl acrylate, allyl methacrylate, and salts or esterified products thereof. One or more species of them may be preferably used.

Metal salts, ammonium salts and organic amine salts are preferable as the above-mentioned salts. Examples of a metal atom forming the metal salts include monovalent metal atoms such as alkali metal atoms such as lithium, sodium, and potassium; divalent metal atoms such as alkaline earth metal atoms such as calcium and magnesium; and trivalent metal atoms such as aluminum and iron. Preferred examples of the organic amine salts include alkanolamine salts such as ethanolamine salts, diethanolamine salts, and triethanolamine salts, and triethylamine salts.

The above-mentioned monomer component may contain other monomers copolymerizable with the above-mentioned (meth)acrylic acid monomers. Examples of other monomers include: aromatic ring-containing unsaturated compounds such as divinylbenzene, styrene, α-methylstyrene, vinyltoluene, and ethyl vinylbenzene; and nitrogen atom-containing unsaturated compounds such as acrylonitrile, methacrylonitrile, acrylamide, methacrylamide, diacetone acrylamide, N-methylol acrylamide, N-methylolmethacrylamide, N-methoxymethyl (meth)acrylamide, N-methoxyethyl (meth)acrylamide, N-n-butoxymethyl (meth)acrylamide, and N-i-butoxymethyl (meth)acrylamide.

It is preferable that the above-mentioned monomer component as a starting material for the acrylic copolymer contains 20% by weight or more of the (meth)acrylic monomer relative to 100% by weight of the entire monomer component. The monomer component more preferably contains 30% by weight or more of the (meth)acrylic monomer.

Further, the monomer component contains 40% by weight or less of the nitrogen atom-containing unsaturated compound, among the above-mentioned other copolymerizable ethylenically unsaturated monomers, such as acrylonitrile, methacrylonitrile, acrylamide, methacrylamide, diacetone acrylamide, N-methylol acrylamide, N-methylolmethacrylamide, N-methoxymethyl (meth)acrylamide, N-methoxyethyl (meth)acrylamide, N-n-butoxymethyl (meth)acrylamide, and N-i-butoxymethyl (meth)acrylamide, relative to 100% by weight of the entire monomer component. The monomer component more preferably contains 20% by weight or less of the nitrogen atom-containing unsaturated compound.

In the emulsion for vibration damping materials (1) of the present invention, it is preferable that the monomer component forming the acrylic copolymer contains one or more polymerizable monomers which form a homopolymer having a glass transition temperature of 0° C. or less. More preferably, the monomer component contains two or more species of such a polymerizable monomer. Most preferably, each monomer component used in the respective steps of multistage polymerization contains one polymerizable monomer which forms a homopolymer having a glass transition temperature of 0° C. or less. As the polymerizable monomer which forms a homopolymer having a glass transition temperature of 0° C. or less, butyl acrylate and 2-ethylhexyl acrylate are preferable.

That is, in the present invention, it is preferable that the monomer component forming the emulsion particles obtainable by emulsion polymerization of the monomer component using the anionic emulsifier and/or the reactive emulsifier contains butyl acrylate and/or 2-ethylhexyl acrylate. If the monomer component contains butyl acrylate and/or 2-ethylhexyl acrylate, the vibration damping property in a wide temperature range can be improved.

More preferably, the monomer component includes butyl acrylate and 2-ethylhexyl acrylate.

If the above-mentioned monomer component forming the acrylic copolymer includes butyl acrylate, it is preferable that the content of the butyl acrylate is 10 to 60% by weight relative to 100% by weight of the monomer component forming the acrylic copolymer. The content is more preferably 20 to 50% by weight.

If the above-mentioned monomer component includes 2-ethylhexyl acrylate, it is preferable that the content of the 2-ethylhexyl acrylate is 5 to 55% by weight relative to 100% by weight of the monomer component forming the acrylic copolymer. The content is more preferably 10 to 50% by weight.

If the above-mentioned monomer component contains both of butyl acrylate and 2-ethylhexyl acrylate, it is preferable that the total content of the butyl acrylate and 2-ethylhexyl acrylate is 20 to 70% by weight relative to 100% by weight of the monomer component forming the acrylic copolymer. The total content is more preferably 30 to 60% by weight.

It is preferable that the above-mentioned monomer component forming the acrylic copolymer contains less than 10% by weight of a functional group-containing unsaturated monomer relative to the total monomer component. The functional group in the functional group-containing unsaturated monomer may be a functional group which generates cross-linkage when the emulsion is obtained by the polymerization. Due to function of such a functional group, the film-formation property or thermal drying property of the emulsion can be improved. The content of the functional group-containing unsaturated monomer is more preferably 0.1 to 3.0% by weight. The above-mentioned content is a proportion relative to 100% by weight of the entire monomer component.

Examples of the functional group of the above-mentioned functional group-containing unsaturated monomer include an epoxy group, an oxazoline group, a carbodiimide group, an aziridinyl group, an isocyanate group, a methylol group, a vinyl ether group, a cyclocarbonate group, and an alkoxysilane group. One or more species of these functional groups may exist in one molecule of the unsaturated monomer.

Examples of the above-mentioned functional group-containing unsaturated monomer include: polyfunctional unsaturated monomers such as divinylbenzene, ethylene glycol di(meth)acrylate, N-methoxymethyl(meth)acrylamide, N-methxoyethyl(meth)acrylamide, N-n-butoxymethyl(meth)acrylamide, N-i-butoxymethyl(meth)acrylamide, N-methylol(meth)acrylamide, diallyl phthalate, diallyl terephthalate, polyethylene glycol di(meth)acrylate, propylene glycol di(meth)acrylate, polypropylene glycol di(meth)acrylate, tetramethylene glycol di(meth)acrylate, polytetramethylene glycol di(meth)acrylate, 1,6-hexanediol di(meth)acrylate, neopentyl glycol di(meth)acrylate; and glycidyl group-containing unsaturated monomers such as glycidyl (meth)acrylate and acryl glycidyl ether. Among these, an unsaturated monomer containing two or more functional groups (polyfunctional unsaturated monomer) is preferably used. These may be used singly or in combination of two or more species of them.

The above-mentioned acrylic copolymer, that is, the emulsion obtainable by emulsion polymerization using the anionic emulsifier and/or the reactive emulsifier has a glass transition temperature (Tg) of −20 to 30° C. As a result, the emulsion can exhibit higher vibration damping property in a wide temperature region. The glass transition temperature is more preferably −10 to 20° C.

The Tg of the acrylic copolymer may be determined based on already acquired knowledge, and also may be controlled by the kind or proportion of the monomer component. However, the Tg can be calculated from the following calculation formula, theoretically, $$\frac{1}{Tg'} = \left[\frac{W_1'}{T_1} + \frac{W_2'}{T_2} + \ldots + \frac{W_n'}{T_n}\right]$$

in the formula, $Tg'$ representing a Tg (absolute temperature) of the acrylic copolymer; $W_1'$, $W_2'$, and ... $W_n'$ each representing a mass fraction of each monomer relative to the entire monomer component; and $T_1$, $T_2$, and ... $T_n$ each representing a glass transition temperature (absolute temperature) of a homopolymer of each monomer component.

If two or more different acrylic copolymers are used as the above-mentioned acrylic copolymer, acrylic copolymers having different Tgs are preferably used. Such a difference in glass transition temperature (Tg) makes it possible for the emulsion for vibration damping materials to exhibit higher vibration damping property in a wide temperature range. Particularly in a practical range of 20 to 60° C., the vibration damping property is dramatically improved. If three or more different acrylic copolymers are used, at least two acrylic copolymers are different in Tg, and the rest one or more acrylic copolymers may have the same Tg as Tg of either of the two acrylic copolymers.

In the above-mentioned acrylic copolymers having different Tgs, the acrylic copolymer having a higher Tg is defined as "acrylic copolymer (A)" and the acrylic copolymer having a lower Tg is defined as "acrylic copolymer (B)". It is preferable that the difference in Tg between the copolymers (A) and (B) is 10 to 60° C. The vibration damping property within the practical range may be insufficient if the difference is less than 10° C. or too large. The difference in Tg between the two is more preferably 15 to 55° C. and more preferably 20 to 50° C.

It is preferable that the above-mentioned acrylic copolymer (A) has a glass transition temperature (TgA) of 0° C. or more and 50° C. or less. The glass transition temperature is more preferably 0° C. or more and 30° C. or less. As a result, a vibration damping coating film formed using a coating material containing the emulsion for vibration damping materials (1) of the present invention has excellent drying property, and blisters and cracks on the coating film surface can be sufficiently suppressed. That is, a vibration damping material having dramatically excellent vibration damping property is formed. The TgA is more preferably 5° C. or more.

It is preferable that the above-mentioned acrylic copolymer (B) has a glass transition temperature (TgB) of −50° C. or more and 10° C. or less. The TgB is more preferably −20° C. or more and 0° C. or less.

As the above-mentioned acrylic copolymer (A), the emulsion obtainable by emulsion polymerization of the monomer component using the anionic emulsifier and/or the reactive emulsifier of the present invention is preferably used. The above-mentioned acrylic copolymer (B) is not especially limited and a commercially available item may be used although an emulsion containing an anionic emulsifier and/or a reactive emulsifier may be used.

The above-mentioned acrylic copolymer preferably has a weight average molecular weight of 20000 to 250000. If the weight average molecular weight is less than 20000, the vibration damping property is insufficient, and the obtained emulsion for vibration damping materials might not exhibit excellent stability when mixed with a coating material. If the weight average molecular weight is more than 250000, the compatibility between the two or more different acrylic copolymers is insufficient, and thereby the emulsion fails to maintain the balance of the vibration damping property and also fails to improve the vibration damping property particularly in a range of 30 to 40° C. Also, such an emulsion may be insufficient in film-forming property at low temperatures when mixed with a coating material. The weight average molecular weight is more preferably 30000 to 220000, and still more preferably 40000 to 200000.

The weight average molecular weight can be measured by GPC (gel permeation chromatography) under the following measurement conditions.

Measurement apparatus: HLC-8120GPC (tradename, product of TOSOH CORP.)
Molecular weight column: serially connected TSK-GEL, GMHXL-L, and TSK-GELG5000HXL (products of TOSOH CORP.)
Eluent: Tetrahydrofuran (THF)
Standard substance for calibration curve: Polystyrene (product of TOSOH CORP.)
Measurement method: A measurement object is dissolved in THF such that the solid content is about 0.2% by weight, and the mixture is filtered and the filtrate as a measurement sample is measured for molecular weight.

The pH of the above-mentioned emulsion obtainable by emulsion polymerization of the monomer component using the anionic emulsifier and/or the reactive emulsifier is not especially limited. The pH is preferably 2 to 10, and more preferably 3 to 9, for example. The pH of the emulsion can be adjusted by adding ammonia water, water-soluble amines, alkali hydroxide aqueous solutions or the like, into the emulsion.

The viscosity of the above-mentioned emulsion obtainable by emulsion polymerization of the monomer component using the anionic emulsifier and/or the reactive emulsifier is not especially limited. The viscosity is preferably 10 to 10000 mPa·s and more preferably 50 to 5000 mPa·s.

The viscosity can be measured under 25° C. and 20 rpm conditions with a B type rotational viscometer.

It is preferable that particles of the emulsion obtainable by emulsion polymerization using the anionic emulsifier and/or the reactive emulsifier are emulsion particles each having a core part and a shell part. If the emulsion has such an embodiment, the emulsion for vibration damping materials (1) of the present invention can exhibit more excellent effects. The emulsion having a core part and a shell part is excellent in vibration damping property in a wide practical temperature range. Particularly, even in a high temperature region, the vibration damping property of the emulsion is more excellent than that of vibration damping compositions in other embodiments. As a result, the emulsion can exhibit the vibration damping performances in a wide practical temperature region from a normal temperature to a high temperature.

If the emulsion has such an embodiment, the emulsion may have a homogeneous structure in which the core part and the shell part are completely compatible with each other and therefore they can not be distinguished from each other, or a core-shell composite structure or a microdomain structure, in which the core part and the shell part are not completely compatible with each other and inhomogeneously formed.

Among these structures, the core-shell composite structure is preferable in order for the emulsion to sufficiently exhibit the characteristics and to be stably produced.

The above-mentioned core-shell composite structure preferably has a form in which the surface of the core part is covered with the shell part. It is preferable that the surface of the core part is perfectly covered with the shell part, especially. However, the surface of the core part may not be perfectly covered. For example, the core-shell composite structure may have a form in which the surface of the core part is covered in a mesh-like state or a form in which the core part is not covered in some parts.

In the above-mentioned emulsion particle having a core part and a shell part, a polymer forming the core part and a polymer forming the shell part are different in any of various properties such as weight average molecular weight, glass transition temperature, SP value (solubility coefficient), kind of a used monomer, and proportion of the monomer. Among these, it is preferable that the two polymers are different in at least one of the weight average molecular weight and the glass transition temperature.

If particles of the above-mentioned emulsion are emulsion particles each having a core part and a shell part, it is preferable that a difference in glass transition temperature (Tg) between a monomer component forming the core part and a monomer component forming the shell part is 10 to 60° C. If the difference in Tg is less than 10° C. or more than 60° C., the vibration damping property in a wide temperature region (20° C. to 60° C.) might not be obtained. The difference in Tg is more preferably 15 to 55° C. and more preferably 20 to 50° C. It is preferable that the Tg of the monomer component forming the core part is higher than the Tg of the monomer component forming the shell part. That is, if the emulsion having the core part and the shell part is produced, such an emulsion is produced by the following multi-stage polymerization: the emulsion forming the core part is formed; and then the emulsion forming the shell part is formed. It is preferable that the Tg of the monomer component used in the former step is higher than the Tg of the monomer component used in the latter step. Also if the emulsion is produced in three or more stages, it is preferable that the Tg of the monomer component used in one step is lower than the Tg of the monomer component used in the last step.

In the above-mentioned emulsion particle having a core part and a shell part, it is preferable that a ratio by weight of the monomer component forming the core part to the monomer component forming the shell part is 20/80 to 70/30. If the ratio by weight of the monomer component forming the core part is smaller than 20/80 or larger than 70/30, the vibration damping property in a wide temperature region can not be obtained.

The emulsion for vibration damping materials (1) of the present invention may be a mixture of the emulsion obtainable by emulsion polymerization of the monomer component using the anionic emulsifier and/or the reactive emulsifier with other emulsion resins. Also in this case, the same operation and effects as in the present invention can be obtained. Preferred examples of other emulsion resins include acrylic resin, urethane resin, SBR resin, epoxy resin, vinyl acetate resin, vinyl acetate-acrylic resin, vinyl chloride resin, vinyl chloride-acrylic resin, vinyl chloride-ethylene resin, vinylidene chloride resin, styrene-butadiene resin, acrylonitrile-butadiene resin. One or more species of them may be used.

In this case, it is preferable that a ratio by weight of the emulsion obtainable by emulsion polymerization of the monomer component using the anionic emulsifier to the other emulsion resins (the emulsion obtainable by emulsion polymerization of the monomer component using the anionic emulsifier and/or the reactive emulsifier/other emulsion resins) is 100 to 50/0 to 50.

With regard to a production method of the emulsion constituting the emulsion for vibration damping materials (1) of the present invention, the monomer component is polymerized by an emulsion polymerization method in the presence of the anionic emulsifier and/or the reactive emulsifier. The embodiment of the emulsion polymerization is not especially limited. For example, the emulsion polymerization can be performed by appropriately adding the monomer component, the polymerization initiator, and the anionic emulsifier and/or the reactive emulsifier in an aqueous medium. It is preferable that a polymerization chain transfer agent and the like is used to adjust the molecular weight.

The above-mentioned emulsifiers may be used as the anionic emulsifier and/or the reactive emulsifier. Other emulsifiers may be used in addition to the anionic emulsifier and/or the reactive emulsifier when the emulsion polymerization is performed. Examples of the other emulsifiers include non-ionic surfactants, cationic surfactants, amphoteric surfactants, and polymer surfactants. One or more species of them may be used.

As a method for controlling the average particle diameter of the above-mentioned emulsion to the above-mentioned preferable range, a method in which apart of the monomer component is added into an aqueous solvent such as water to form seed particles, and then, the rest of the monomer component is added to form emulsion particles is preferable. The average particle diameter of the emulsion is influenced by the number of the seed particles in the aqueous medium. Therefore, the amount of the monomer component which is added into an aqueous medium for forming the seed particles is appropriately adjusted. Thereby, the number of the seed particles is controlled to adjust the average particle diameter of the emulsion to the above-mentioned preferable range.

The monomer emulsion composed of water, the emulsifier, and the polymerizable monomer, which is directly charged into a polymerization vessel to form the seed particles, accounts for 0.5 to 10% by weight relative to the total amount of charged substances. A method of directly charging only an aqueous solution of the emulsifier into a polymerization vessel is mentioned as a preferable method. It is preferable that the monomer emulsion accounts for 0.1 to 1.5% by weight on emulsifier solid content basis relative to the total amount of the polymerizable monomer.

It is important to prevent additional particles from being generated after the seed particles are generated. In order to produce the above-mentioned emulsion having a particle size distribution of 5 to 40% as the emulsion constituting the emulsion for vibration damping materials (1) of the present invention, it is necessary to constantly secure a specific value or more of a reactivity. Specifically, the seed particles are formed by charging a part of the monomer emulsion into a polymerization kettle and then being subjected to an initial polymerization reaction. The polymerization ratio after completion of the initial polymerization is preferably 80% or more and more preferably 90% or more. The reactant is sampled 30 minutes later after completion of the reaction step and then measured for solid content. The ratio of the measured solid content relative to a theoretical solid content calculated from a charged amount of starting materials used for the initial polymerization step is calculated, and the thus-calculated ratio is defined as a reactivity.

The thus-obtained emulsion is one of the preferable embodiments of the present invention. Thus, the present invention also includes a production method of the above-mentioned emulsion for vibration damping materials (1), wherein the monomer component is subjected to emulsion polymerization using the anionic emulsifier and/or the reactive emulsifier while the particle diameter of the emulsion particles is controlled.

It is preferable that if the emulsion constituting the emulsion for vibration damping materials (1) of the present invention is an emulsion having a core part and a shell part, the emulsion is obtainable by a common emulsion polymerization method. Specifically, it is preferable that the emulsion is obtainable by the following multi-stage polymerization: the monomer component is subjected to emulsion polymerization in an aqueous medium in the presence of an emulsifier and/or a protective colloid, thereby forming a core part; and then the monomer component is further polymerized with the emulsion having a core part through emulsion polymerization, thereby forming a shell part. Thus, the preferable embodiments of the present invention include an embodiment in which the emulsion constituting the emulsion for vibration damping materials (1) of the present invention is an emulsion having a core part and a shell part, and the emulsion is obtainable by multi-stage polymerization in which the core part is formed and then the shell part is formed.

If the emulsion having a core part and a shell part is produced, a method in which a part of the monomer component forming the core part is added into an aqueous solvent such as water to form seed particles and then the rest of the monomer component is added to form the core part, and after that, the monomer component forming the shell part is added to form the shell part is preferable. The average particle diameter of the emulsion is influenced by the number of the seed particles in the aqueous medium. Therefore, the amount of the monomer component which is added into an aqueous medium for forming the seed particles is appropriately adjusted. Thereby, the number of the seed particles is controlled to adjust the average particle diameter of the emulsion to the above-mentioned preferable range.

After the seed particles are generated, it is important to prevent additional particles from being generated after the seed particles are generated. In order to produce the above-mentioned emulsion having a particle size distribution of 5 to 40% as the emulsion constituting the emulsion for vibration damping materials (1) of the present invention, it is necessary to constantly secure a specific value or more reactivity. Specifically, the polymerization ratio which is measured 30 minutes later after completion of the dropwise addition at the first stage is preferably 80% or more and more preferably 90% or more.

The above-mentioned aqueous medium is not especially limited. Examples thereof include water, a mixture solvent composed of one or more water-miscible solvents, or a mixture solvent containing water as a main component and such solvents. Among these, water is preferably used.

The use amount of the above-mentioned anionic emulsifier and/or the reactive emulsifier is 0.1 to 10% by weight relative to the total use amount of the polymerizable unsaturated bond group-containing compounds. If the use amount is less than 0.1% by weight, the mechanical stability is not sufficiently improved and further the polymerization stability might not be sufficiently maintained. The use amount is more preferably 0.5 to 5% by weight and most preferably 1 to 3% by weight.

Among the above-mentioned surfactants, non-nonylphenyl surfactants are preferably used in view of environment.

The use amount of the above-mentioned surfactant may be appropriately determined depending on the kind of the used surfactant or the kind of the used monomer component. For example, the use amount of the surfactant is preferably 0.3 to 10 parts by weight, and more preferably 0.5 to 5 parts by weight, relative to 100 parts by weight of the total amount of the monomer component used for forming the emulsion.

Examples of the above-mentioned protective colloid include polyvinyl alcohols such as partially saponificated polyvinyl alcohols, completely saponificated polyvinyl alcohols, and modified polyvinyl alcohols; cellulose derivatives such as hydroxyethyl cellulose, hydroxypropylcellulose, and carboxymethylcellulose salt; natural polysaccharides such as Guar gum. One or more species of them may be used. Such a protective colloid may be used singly or in combination with the surfactant.

The use amount of the above-mentioned protective colloid may be appropriately determined depending on use conditions. For example, it is preferably 5 parts by weight or less, and more preferably 3 parts by weight or less, relative to 100 parts by weight of the total amount of the monomer component used for preparing the acrylic copolymer.

The above-mentioned polymerization initiator is not especially limited as long as it is a substance which is decomposed by heating and generates radical molecules. Water-soluble initiators are preferably used. Examples of such an initiator include persulfates such as potassium persulfate, ammonium persulfate, and sodium persulfate; water-soluble azo compounds such as 2,2'-azobis(2-amidinopropane) dihydrochloride and 4,4'-azobis(4-cyanopentanoic acid); thermal decomposition initiators such as hydrogen peroxide; and redox polymerization initiators such as hydrogen peroxide and ascorbic acid, t-butyl hydroperoxide and rongalite, potassium persulfate and metal salt, and ammonium persulfate and sodium hydrogen sulfite. One or more species of them may be used.

The use amount of the above-mentioned polymerization initiator is not especially limited and may be appropriately determined depending on the kind of the polymerization initiator, and the like. For example, the use amount of the polymerization initiator is preferably 0.1 to 2 parts by weight and more preferably 0.2 to 1 part by weight, relative to 100 parts by weight of the total amount of the monomer component used for preparing the acrylic copolymer.

A reducing agent may be used in combination with the above-mentioned polymerization initiator, if needed, in order to accelerate the emulsion polymerization. Examples of the reducing agent include reducing organic compounds such as ascorbic acid, tartaric acid, citric acid, and grape sugar; and reducing inorganic compounds such as sodium thiosulfate, sodium sulfite, sodium bisulfite, and sodium metabisulfite. One or more species of them may be used.

The use amount of the above-mentioned reducing agent is not especially limited and preferably 0.05 to 1 part by weight, relative to 100 parts by weight of the total amount of the monomer component used for preparing the acrylic copolymer, for example.

The above-mentioned polymerization chain transfer agent is not especially limited. Examples of the above-mentioned polymerization chain transfer agent include alkyl mercaptans such as hexyl mercaptan, octyl mercaptan, n-dodecyl mercaptan, t-dodecyl mercaptan, n-hexadecyl mercaptan, and n-tetradecyl mercaptan; halogenated hydrocarbons such as carbon tetrachloride, carbon tetrabromide, and ethylene bromide; mercaptocarboxylic acid alkyl esters such as 2-ethylhexyl mercaptoacetate, 2-ethylhexyl mercaptopropionate, and tridecyl mercaptopropionate; mercaptocarboxylic acid alkoxyalkyl esters such as methoxybutyl mercaptoacetate and methoxybutyl mercaptopropionate; carboxylic acid mercaptoalkyl esters such as 2-mercaptoethyl octanoate; α-methylstyrene dimer, terpinolene, α-terpinene, γ-terpinene, dipentene, anisole, and allyl alcohol. These may be used singly or in combination of two or more species of them. Among these, it is preferable to use an alkylmercaptan such as hexylmercaptan, octylmercaptan, n-dodecylmercaptan, t-dodecylmercaptan, n-hexadecylmercaptan, n-tetradecylmercatan or the like. The use amount of the polymerization chain transfer agent is generally 2.0 parts by weight or less, and preferably 1.0 part by weight or less relative to 100 parts by weight of the total monomer component.

If necessary, the above-mentioned emulsion polymerization may be performed in the presence of a chelating agent such as sodium ethylenediaminetetraacetate, a dispersant such as sodium polyacrylate, or an inorganic salt. With regard to the addition method of the monomer component, the polymerization initiator, and the like, any of en bloc addition, continuous addition, multi-stage addition and the like may be employed. These addition methods may be used in a suitable combination.

Regarding the emulsion polymerization conditions in the above-mentioned production method, the polymerization temperature is not especially limited and preferably 0 to 100° C. and more preferably 40 to 95° C., for example. The polymerization time is not especially limited, and preferably 1 to 15 hours, and more preferably 5 to 10 hours, for example.

In the production method of the emulsion constituting the emulsion for vibration damping materials (1) of the present invention, it is preferable that the emulsion is produced by emulsion polymerization and then the emulsion is neutralized with a neutralizer. As a result, the emulsion is stabilized. The neutralizer is not especially limited. Examples thereof include tertiary amines such as triethanolamine, dimethylethanolamine, diethylethanolamine, morpholine; ammonia water; and sodium hydroxide. These may be used singly or in combination of two or more species of them. Among these, volatile bases which evaporate from the coating film at the time of heating are preferably used because the water resistance and the like is improved in the coating film formed from a vibration damping composition essentially containing the emulsion for vibration damping materials. More preferably, an amine having a boiling point of 80 to 360° C. is used because the thermal drying property becomes excellent and the vibration damping property is improved. As such a neutralizer, tertiary amines such as triethanolamine, dimethylethanolamine, diethylethanolamine, and morpholine are preferred, for example. More preferably, an amine having a boiling point of 130 to 280° C. is employed.

The above-mentioned boiling point is a boiling point under atmospheric pressure.

If the neutralizer is used for producing the emulsion for vibration damping materials (1A) of the present invention, it is preferable that the addition amount of the neutralizer is determined in such a way that a neutralized carboxyl group-containing monomer accounts for 1.0 to 2.0% by mole relative to the number of moles of all of the monomers. If the proportion of the neutralized carboxyl group relative to the number of moles of all of the monomer is within such a range, the water retentivity on the particle surface is neither insufficient nor increased. Therefore, the coating film exhibits excellent thermal drying performances. The addition amount of the neutralizer is more preferably determined in such a way that the neutralized carboxyl group-containing monomer accounts for 1.5 to 2.0% by mole relative to the number of moles of all of the monomers.

If the neutralizer is used to produce an emulsion for vibration damping materials (1B) of the present invention, it is preferable that the addition amount of the neutralizer is determined in such a way that an acid value of the emulsion, that is, a base of the neutralizer accounts for 0.6 to 1.4 equivalents relative to one equivalent of an acid group contained in the emulsion. It is more preferable that the base of the neutralizer accounts for 0.8 to 1.2 equivalents.

As mentioned above, in the emulsion constituting the emulsion for vibration damping materials (1) of the present invention, the proportion of the neutralized carboxyl group-containing monomer in the monomer component forming the emulsion is within a specific range. As a result, the emulsion capable of forming a coating film more excellent in thermal drying property can be obtained.

The present invention also includes an emulsion for vibration damping materials, including an emulsion obtainable by emulsion polymerization of a monomer component, wherein the emulsion is obtainable by emulsion polymerization using an anionic emulsifier and/or a reactive emulsifier; a neutralized carboxyl group-containing monomer accounts for 1.0 to 2.0% by mole relative to the number of moles of all of the monomers forming the emulsion; and emulsion particles have an average particle diameter of 100 to 450 nm. This emulsion for vibration damping materials may be produced by producing an emulsion and neutralizing the emulsion by addition of the above-mentioned neutralizer, thereby adjusting the neutralized carboxyl group-containing monomer to the above-mentioned range relative to the number of moles of all of the monomers. Alternatively, this emulsion for vibration damping materials may be produced by producing an emulsion using a monomer component including a neutralized carboxyl group-containing monomer at an amount previously calculated and adjusted to the above-mentioned range.

If the number average molecular weight of the emulsion polymer contained in the emulsion for vibration damping materials (1) of the present invention is small, the compatibility of a filler such as inorganic powders with the emulsion is improved and therefore the dispersibility is improved in the vibration damping composition including the emulsion for vibration damping materials (1) essentially containing the emulsion.

The emulsion for vibration damping materials (2) of the present invention is mentioned below.

The emulsion for vibration damping materials (2) of the present invention contains acrylic emulsion particles each having a core part and a shell part. The emulsion for vibration damping materials (2) may contain one or more species of such emulsion particles. As long as the emulsion (2) contains at least one acrylic emulsion particles each having a core part and a shell part, the emulsion (2) may contain other emulsion particles other than the acrylic emulsion particles each having a core part and a shell part. It is preferable that the acrylic emulsion particles each having a core part and a shell part accounts for 50% by weight or more relative to 100% by weight of the total amount of the emulsion particles. More preferably, the acrylic emulsion particles account for 80% by weight or more.

Other emulsion resins mentioned below may be used as the other emulsion which gives emulsion particles.

The emulsion for vibration damping materials (2) of the present invention includes acrylic emulsion particles each having a core part and a shell part. The acrylic emulsion particles exist in the form of particles of an acrylic polymer, dispersed into a medium. An aqueous medium is preferable as the medium. Examples thereof include water and mixed solvents of water and a water-miscible solvent. Among these, water is preferred in view of influence on environment or safety, which may be caused by use of a coating material containing the emulsion for vibration damping materials (2) of the present invention.

It is preferable that the nonvolatile content in the above-mentioned emulsion for vibration damping materials (2), that is, the content of the acrylic emulsion particles is 30% by weight or more and 70% by weight or less relative to 100% by weight of the total amount of the emulsion for vibration damping materials (2). If the content is more than 70% by weight, the viscosity of the emulsion for vibration damping materials becomes too high, and thereby, the emulsion may not maintain sufficient dispersion stability and then aggregate. If the content is less than 30% by weight, sufficient vibration damping property might not be exhibited. The content is more preferably 50% by weight or more and 65% by weight or less.

If the emulsion for vibration damping materials (2) includes other emulsion particles other than the above-mentioned acrylic emulsion particles, it is preferable that the nonvolatile content in the entire emulsion for vibration damping materials (2) of the present invention, including the acrylic emulsion particles and the other emulsion particles satisfies the above-mentioned value.

The acrylic emulsion particles contained in the emulsion for vibration damping materials (2) of the present invention each contain a core part and a shell part. The emulsion particle may have a homogeneous structure in which the core part and the shell part are completely compatible with each other and therefore they can not be distinguished from each other, or a core-shell composite structure or a microdomain structure, in which the core part and the shell part are not completely compatible with each other and inhomogeneously formed.

Among these structures, the core-shell composite structure is preferable in order for the acrylic emulsion to sufficiently exhibit the characteristics and to be stably produced.

The above-mentioned core-shell composite structure preferably has a form in which the surface of the core part is covered with the shell part. It is preferable that the surface of the core part is perfectly covered with the shell part, especially. However, the surface of the core part may not be perfectly covered. For example, the core-shell composite structure may have a form in which the surface of the core part is covered in a mesh-like state or a form in which the core part is not covered in some places.

It is preferable that the acrylic emulsion particles have an average particle diameter of 100 to 450 nm. If the average particle diameter is less than 100 nm, the viscosity of the emulsion for vibration damping materials might become too high or the emulsion for vibration damping materials might not maintain sufficient dispersion stability and then aggregate. If the average particle diameter is more than 450 nm, such an emulsion is no longer an emulsion. The average particle diameter is more preferably 120 to 400 nm, and still more preferably 150 to 350 nm.

The average particle diameter is determined as follows, for example. The emulsion is diluted with distilled water and then sufficiently stirred and mixed. Then, about 10 mL of the mixture is charged into a glass cell and subjected to measurement by a dynamic light scattering method using a particle size distribution analyzer ("NICOMP Model 380", product of Particle Sizing Systems).

If the emulsion for vibration damping materials (2) of the present invention includes other emulsion particles other than the above-mentioned acrylic emulsion particles, it is preferable that the entire emulsion for vibration damping materials (2) of the present invention including acrylic emulsion particles and other emulsion particles is also within the above-mentioned range.

It is preferable that the acrylic emulsion particles have a particle size distribution of 40% or less, and the particle size distribution is defined as a value obtained by dividing a standard deviation by a volume particle size thereof (standard deviation/volume average particle diameter×100).

More preferably, the particle size distribution is 30% or less. If the particle size distribution is more than 40%, the particle size distribution of the emulsion particles becomes very wide and the emulsion partly contains coarse particles.

Therefore, due to influence of such coarse particles, the emulsion might not exhibit sufficient low-temperature storage stability.

In the above-mentioned acrylic emulsion having a core part and a shell part, a polymer forming the core part and a polymer forming the shell part are different in any of various properties such as weight average molecular weight, glass transition temperature, SP value (solubility coefficient), kind of a used monomer, and proportion of the monomer. Among them, it is preferable that the two polymers are different in at least one of the weight average molecular weight and the glass transition temperature.

Further, the above-mentioned acrylic emulsion is formed by polymerizing a monomer component essentially including a (meth)acrylic monomer and a monomer having a Q value of 0.6 to 1.4 and an e value of −0.4 to −1.2. One or more species of the (meth)acrylic monomer may be used, and one or more species of the monomer having Q and e values within specific ranges may be used. The (meth)acrylic monomer and the monomer having Q and e values within specific ranges may be contained in one or both of the monomer component forming the core part of the emulsion and the monomer component forming the shell part of the emulsion.

It is preferable that the above-mentioned monomer component contains 0.1 to 20% by weight of the (meth)acrylic acid monomer and 99.9 to 80% by weight of the other copolymerizable ethylenically unsaturated monomers relative to 100% by weight of the entire monomer component. If the monomer component includes the (meth)acrylic acid monomer, the dispersibility of a filler such as inorganic powders is improved and the vibration damping property is more improved in a vibration damping composition essentially including the emulsion for vibration damping materials (2) of the present invention. Further, if the monomer component contains other copolymerizable ethylenically unsaturated monomers, an acid value, a Tg, physical properties, and the like, of the emulsion are easily adjusted. If the content of the (meth)acrylic acid monomer in the monomer component is less than 0.1% by weight or more than 20% by weight, the emulsion might not be stably produced by the copolymerization. The emulsion in the present invention can more sufficiently exhibit excellent thermal drying property and vibration damping property when used in an aqueous vibration damping material, because of a synergistic effect of monomer units derived from these monomers.

It is more preferable that 0.5 to 3% by weight of a (meth)acrylic acid monomer and 99.5 to 97% by weight of other copolymerizable ethylenically unsaturated monomers are included relative to the entire monomer component 100% by weight.

Examples of the other copolymerizable ethylenically unsaturated monomers include (meth)acrylic monomers other than (meth)acrylic acid monomers, nitrogen atom-containing unsaturated monomers, and styrene monomers, mentioned below.

It is preferable that the proportion of the (meth)acrylic monomer in the above-mentioned monomer component is 20 to 80% by weight relative to 100% by weight of the entire monomer component. The proportion is more preferably 30 to 70% by weight.

It is preferable that the proportion of the monomer having the Q and e values within specific ranges is 20 to 80% by weight relative to 100% by weight of the entire monomer component. The proportion is more preferably 30 to 70% by weight and still more preferably 40 to 60% by weight.

The (meth)acrylic monomer means a (meth)acrylic acid monomer and salts or esterified products thereof. As the (meth)acrylic monomer, the compounds mentioned in the emulsion for vibration damping materials (1) may be used. As the (meth)acrylic monomers other than the (meth)acrylic acid monomers, the compounds mentioned in the emulsion for vibration damping materials (1) may be used.

The above-mentioned monomer component may contain other monomers, in addition to the acrylic monomer and the monomer having the Q and e value within specific ranges. Examples of the other monomers include unsaturated monomers containing a nitrogen atom such as acrylonitrile, methacrylonitrile, acrylamide, methacrylamide, diacetone acrylamide, N-methylol acrylamide, and N-methylolmethacrylamide.

The content of the above-mentioned other monomers is preferably 40% by weight or less relative to 100% by weight of the total monomer component. The content is more preferably 20% by weight or less.

In the above-mentioned acrylic emulsion, the weight average molecular weight of the entire system in which the core part and the shell part are combined is the same as that of the emulsion constituting the above-mentioned emulsion for vibration damping materials (1).

If two or more different acrylic emulsions are used as the above-mentioned acrylic emulsion having a core part and a shell part, acrylic emulsions having different Tgs are preferably used. Such a difference in glass transition temperature (Tg) makes it possible for the emulsion for vibration damping materials to exhibit higher vibration damping property in a wide temperature range. Particularly in a practical range of 20 to 60° C., the vibration damping property is dramatically improved. If three or more different acrylic emulsions are used, at least two different acrylic emulsions are different in Tg, and the rest one or more acrylic emulsions may have the same Tg as Tg of either of the two acrylic emulsions.

In the above-mentioned acrylic emulsions having different Tgs, the acrylic emulsion having a higher Tg is defined as "acrylic emulsion (A)" and the acrylic emulsion having a lower Tg is defined as "acrylic emulsion (B)". The preferable difference in Tg between the acrylic emulsions (A) and (B), and the preferable glass transition temperatures (TgA) and (TgB) of the acrylic emulsions (A) and (B) are the same as those mentioned in the case where the two or more different acrylic copolymers having different Tgs are used as the copolymers constituting the emulsion for vibration damping materials (1).

In the above-mentioned acrylic emulsion particles, it is preferable that a monomer component forming the core part and a monomer component forming the shell part differ in a glass transition temperature (Tg) by 10 to 60° C. If the difference in Tg is less than 10° C. or more than 60° C., the vibration damping property in a wide temperature region (20° C. to 60° C.) can not be obtained. The difference in Tg is more preferably 15 to 55° C. and more preferably 20 to 50° C. It is preferable that the Tg of the monomer component forming the core part is higher than the Tg of the monomer component forming the shell part. That is, if the emulsion having the core part and the shell part is produced, such an emulsion is produced by the following multi-stage polymerization: the emulsion forming the core part is formed; and then the emulsion forming the shell part is formed. It is preferable that the Tg of the monomer component used in the former step is higher than the Tg of the monomer component used in the latter step. Also if the emulsion is produced in three or more stages, it is preferable that the Tg of the monomer component used in one step is lower than the Tg of the monomer component used in the last step.

It is preferable that the Tg of the entire acrylic emulsion is −20 to 30° C. The Tg is more preferably −10 to 20° C. and still more preferably −5 to 10° C.

The Tg of the acrylic emulsion can be determined by the above-mentioned method.

In the above-mentioned acrylic emulsion particles, it is preferable that a ratio by weight of the monomer component forming the core part to the monomer component forming the shell part is 20/80 to 70/30. If the ratio by weight of the monomer component forming the core part is smaller than 20/80 or larger than 70/30, the vibration damping property in a wide temperature region can not be obtained.

The preferable pH and viscosity of the above-mentioned acrylic emulsion are the same as those mentioned in the emulsion constituting the emulsion for vibration damping materials (1).

It is preferable that the monomer component forming the acrylic emulsion particles in the emulsion for vibration damping materials (2) of the present invention contains 25% by weight or less of an acrylic hard monomer. The acrylic hard monomer is a monomer which is added to prevent mixing of the monomer constituent of core part and that of shell part and a Tg of the acrylic hard monomer is higher than that of other monomers in the acrylic monomer component. Further, the acrylic hard monomer is a monomer which has a Tg higher than the Tg of the entire monomer (also referred to as a soft monomer) other than the hard monomer in the acrylic monomer component by 30° C. or more. The content of the acrylic hard monomer is more preferably 20% by weight or less and still more preferably 10% by weight or less. According to the acrylic emulsion particles in the emulsion for vibration damping materials (2) of the present invention, the mixing of the monomer constituent of core part and that of shell part in the core-shell structure of the emulsion can be suppressed because the emulsion particles are formed using the monomer having the Q and e values within specific ranges. Also, the use amount of the acrylic hard monomer used conventionally to suppress such a mixing of the monomer constituent of core part and that of shell part can be reduced. Even if the use amount of the acrylic hard monomer is reduced, an acrylic emulsion having a core-shell structure in which the mixing of the monomer constituent of core part and that of shell part is hardly generated can be produced more inexpensively than before, without deteriorating the vibration damping property of the acrylic emulsion. The present invention also includes such a method for producing the emulsion for vibration damping materials, which includes acrylic emulsion particles each having a core part and a shell part using the monomer component essentially containing the monomer having the Q and e values within the specific ranges.

Methacrylic acid esters such as methyl methacrylate are preferable as the above-mentioned acrylic hard monomer which is used to suppress the mixing of the monomer constituent of core part and that of shell part of the core-shell structure of the emulsion. One or more different acrylic hard monomers may be used.

In the emulsion for vibration damping materials (2) of the present invention, it is preferable that the monomer forming the acrylic emulsion particles and having a Q value of 0.6 to 1.4 and an e value of −0.4 to −1.2 is a styrene monomer. The styrene monomer means styrene or its derivatives. The number or kind of the substituent is not especially limited as long as it includes a styrene skeleton in the structure. One or more species of them may be used.

Examples of the above-mentioned styrene monomers include styrene, p-methylstyrene, p-tert-butyl styrene, p-methoxy styrene, 3,4-dimethoxy styrene, α-acetoxy styrene, p-acetoxy styrene, p-chloromethyl styrene, o-vinyl phenol, m-vinyl phenol, 2-vinylpyridine, 5-vinyl-2-picoline, 2-isopropenyl naphthalene, 2-(o-methyl)-4-vinyl catechol, and trimethyl (p-vinyl phenylsilane). Styrene is more preferable.

In the present invention, it is preferable that the monomer component forming the acrylic emulsion particles contains one or more polymerizable monomers which form a homopolymer having a glass transition temperature of 0° C. or less. More preferably, the monomer component contains two or more species of such a polymerizable monomer. Most preferably, each monomer component used in the respective steps of multi-stage polymerization contains one polymerizable monomer which forms a homopolymer having a glass transition temperature of 0° C. or less. As the polymerizable monomer which forms a homopolymer having a glass transition temperature of 0° C. or less, butyl acrylate and 2-ethylhexyl acrylate are preferable.

That is, in the present invention, it is preferable that the monomer component forming the acrylic emulsion particles includes butyl acrylate and/or 2-ethylhexyl acrylate. If the monomer component contains butyl acrylate and/or 2-ethylhexyl acrylate, the vibration damping property in a wide temperature region can be improved.

More preferably, the monomer component contains butyl acrylate and 2-ethylhexyl acrylate.

If any cases where the above-mentioned monomer component contains butyl acrylate; it contains 2-ethylhexyl acrylate; and it contains both of butyl acrylate and 2-ethylhexyl acrylate, the preferable content of the butyl acrylate and that of the 2-ethylhexyl acrylate are the same as those mentioned in the case where the emulsion constituting the emulsion for vibration damping materials (1) includes butyl acrylate and/or 2-ethylhexy acrylate.

The emulsion for vibration damping materials (2) of the present invention may be a mixture of the emulsion which gives the acrylic emulsion particles each having a core part and a shell part and other emulsion resins. Also in this case, the same operation and effects as in the present invention can be obtained.

As the other emulsion resins and the preferable proportion of the other emulsion resins, those mentioned in the above-mentioned emulsion for vibration damping materials (1) of the present invention may be mentioned.

The emulsion for vibration damping materials (2) of the present invention is preferably obtainable by multi-stage polymerization using a common emulsion polymerization method. Thus, the embodiment in which the above-mentioned emulsion for vibration damping materials (2) is obtainable by multi-stage polymerization is also one of the preferable embodiments of the present invention.

The present invention is also a production method of the above-mentioned emulsion for vibration damping materials (2), wherein the emulsion for vibration damping materials is produced by performing an emulsion polymerization step using monomer components having different glass transition temperatures through multiple stages.

In the above-mentioned production method of the emulsion for vibration damping materials (2), it is preferable that the emulsion polymerization of the monomer component forming the core part is performed earlier than the emulsion polymerization of the monomer component forming the shell part.

For example, preferred is a production method of the above-mentioned emulsion for vibration damping materials, wherein an emulsion polymerization step using monomer components having different glass transition temperatures is performed through multiple stages, and an emulsion polymerization step at the first stage is a step of performing polymerization using the monomer component forming the core part, and an emulsion polymerization step at the last stage is a step of performing polymerization using the monomer component forming the shell part.

It is preferable that the above-mentioned production method is specifically a method including a step (a) of forming a core part by subjecting monomer components to emulsion polymerization in an aqueous medium in the presence of a surfactant and/or a protective colloid; and a step (b) of forming a shell part by subjecting the emulsion containing the core part into emulsion polymerization with the monomer components. According to such a production method, the emulsion for vibration damping materials, which contains particles each having a core-shell composite structure, can be preferably obtained. Among these, in the above-mentioned production method, it is preferable that the compatibility of the polymer forming the core part with the polymer forming the shell part, the hydrophilic level (SP value) of these acrylic copolymers, the weight average molecular weight of these copolymers, and the like, can be adjusted. As a result, a desirable emulsion for vibration damping materials of the present invention, which includes particles each having a core-shell composite structure can be obtained.

According to the above-mentioned production method in a preferable embodiment, the core part is formed in the step of performing the emulsion polymerization using the monomer component forming the core part, and in the step of performing the emulsion polymerization using the monomer component forming the shell part, the shell part is formed to contact the core part. As a result, the emulsion for vibration damping materials (2) of the present invention is more effectively obtained. Further, if the emulsion polymerization step is performed through three or more stages, it is preferable that the step of performing the emulsion polymerization using the monomer component forming the core part is performed as the first stage and the step of performing the emulsion polymerization using the monomer component forming the shell part is performed as the final stage. One or more other steps, that is, one or more emulsion polymerization steps between the first stage and the final stage are not especially limited as long as the emulsion polymerization steps are performed in the above-mentioned order.

It is preferable in each step of the above-mentioned multistage polymerization that the monomer component is additionally charged after 80% or more of the monomer component charged in the former stage is polymerized. More preferably, the monomer component is additionally charged after 90% or more of the monomer component is polymerized.

Herein, the above-mentioned "monomer components having different glass transition temperatures" means monomer components satisfying the condition that homopolymers prepared using such monomer components have different glass transition temperatures (absolute temperatures).

As a method of producing the emulsion each having a core part and a shell part through multi-stage polymerization, a method in which a part of the monomer component forming the core part is added dropwise into an aqueous solvent such as water to form seed particles and then the rest of the monomer component is added to form the core part, and after that, the monomer component forming the shell part is added to form the shell part is preferable. The effects obtained by this method and the specific methods are the same as in the case where this method is used for producing the above-mentioned emulsion constituting the emulsion for vibration damping materials (1) of the present invention.

The above-mentioned surfactant used in the emulsion polymerization may be a surfactant generally used in the emulsion polymerization, and it is not especially limited. Examples of such a surfactant include anionic surfactants, nonionic surfactants, cationic surfactants, amphoteric surfactants, polymer surfactants, and reactive surfactants. One or more species of them are preferably used. As these surfactants, those used in the production of the emulsion constituting the emulsion for vibration damping materials (1) of the present invention may be used.

Among the above-mentioned surfactants, non-nonylphenyl surfactants are preferably used in view of environment.

The use amount of the above-mentioned surfactant may be appropriately determined depending on the kind of the used surfactant or the kind of the used monomer component, and the like. For example, the use amount of the surfactant is preferably 0.3 to 10 parts by weight, and more preferably 0.5 to 5 parts by weight, relative to 100 parts by weight of the total amount of the monomer components used for preparing the emulsion.

As the above-mentioned protective colloid, those used in the production of the emulsion constituting the emulsion for vibration damping materials (1) of the present invention can be used. The use amount thereof is also the same.

In addition, in the production method of the emulsion for vibration damping materials (2) of the present invention, it is preferable that a polymerization initiator is used to initiate the emulsion polymerization. If needed, a reducing agent may be used together in order to accelerate the emulsion polymerization. Further, it is preferable that a chain transfer agent is used during the emulsion polymerization if needed, to adjust the weight average molecular weight of the acrylic emulsion. As these polymerization initiator, reducing agent, and chain transfer agent, those mentioned in the production of the emulsion constituting the emulsion for vibration damping materials (1) of the present invention may be used. The use amount thereof is also the same.

The polymerization temperature, the polymerization time, the method of adding the monomer component and the polymerization initiator, and the like, in the production method of the above-mentioned emulsion for vibration damping materials (2), are the same as those in the production of the above-mentioned emulsion constituting the emulsion for vibration damping materials (1) of the present invention.

In the production method of the emulsion constituting the emulsion for vibration damping materials (2) of the present invention, it is preferable that the emulsion is produced by emulsion polymerization and then the emulsion is neutralized with a neutralizer. As the neutralizer, those mentioned in the production of the above-mentioned emulsion constituting the emulsion for vibration damping materials (1) of the present invention may be used.

It is preferable that the addition amount of the neutralizer is determined in such a way that an acid value of the emulsion, that is, a base of the neutralizer accounts for 0.6 to 1.4 equivalents relative to one equivalent of an acid group contained in the emulsion. It is more preferable that the base of the neutralizer accounts for 0.8 to 1.2 equivalents.

In the production method of the above-mentioned emulsion for vibration damping materials (2), the core part and the shell part are basically formed in the same manners, but if needed, the additives and the reaction conditions may be different. For example, in the above-mentioned emulsion polymerization in the step (b), the surfactant and/or the protective colloid may not be added.

The vibration damping composition of the present invention is mentioned below.

Each of the emulsions for vibration damping materials (1) and (2) of the present invention can constitute a vibration damping composition, if needed, in combination of other components. The present invention also includes a vibration damping composition essentially including such an emulsion for vibration damping materials of the present invention. Such a composition can form an aqueous vibration damping material which can exhibit excellent thermal drying property and vibration damping property.

It is preferable that the above-mentioned vibration damping composition contains 50 to 90% by weight of a solid content relative to 100% by weight of the total amount of the vibration damping composition. The solid content is more preferably 60 to 90% by weight and still more preferably 70 to 90% by weight. The pH of the vibration damping composition is preferably 7 to 11. More preferably, the pH is 7 to 9.

It is preferable that the content of the emulsion for vibration damping materials (1) and/or (2) in the above-mentioned vibration damping composition is determined in such a way that the solid content of the emulsion for vibration damping materials (1) and/or emulsion for vibration damping materials (2) is 10 to 60% by weight relative to 100% by weight of the solid content of the vibration damping composition. The solid content is more preferably 15 to 55% by weight. The solid content of the emulsion for vibration damping materials (1) and/or emulsion for vibration damping materials (2) means the total weight of the solid content of the emulsion for vibration damping materials (1) and the solid content of the emulsion for vibration damping materials (2).

The vibration damping property of the above-mentioned vibration damping composition can be evaluated by measuring a loss coefficient of a coating film formed using the vibration damping composition. The loss coefficient is generally represented by η, and it is the most general index expressing vibration damping performances. Also in the present invention, the loss coefficient is preferably used for evaluating the vibration damping performances. The higher loss coefficient the coating film shows, the more excellent vibration damping performances the coating film has. Further, it is preferable that the composition is influenced by a temperature and exhibits high vibration damping performances within a practical temperature range. In the present invention, for example, the practical temperature range of the coating film formed using the vibration damping composition is generally 20 to 60° C. It is preferable that the coating film has a loss coefficient of 0.10 or more at 40° C. More preferably, the coating film has a loss coefficient of 0.12 or more at 40° C. In the present invention, for example, the practical temperature range of the coating film formed using the vibration damping composition is generally 20 to 60° C. Therefore, it is preferable that the vibration damping performances are evaluated based on the total loss coefficients at 20° C., 40° C., and 60° C. That is, the higher the total loss coefficients at 20° C., 40° C., and 60° C. is, the more excellent practical vibration damping performances the coating film has. Thus, the loss coefficient is useful as one index for evaluating the vibration damping property. The preferable range of the total loss coefficients at 20° C., 40° C., and 60° C. is 0.200 or more. According to this invention, the total loss coefficients can absolutely satisfy this value, According to one of the advantageous effects of the present invention, as mentioned above, the emulsion is excellent in the mechanical stability, the surface state of the dried coating film, the resistance to coating film collapsibility (coating film collapsibility after baking) and further, the emulsion can exhibit excellent vibration damping performances in a wide practical temperature range. That is, the emulsion is excellent in these performances.

According to the present invention, it is preferably that the above-mentioned total loss coefficients at 20° C., 40° C., and 60° C. satisfy 0.220 or more. The total loss coefficients more preferably satisfy 0.240 or more, and still more preferably 0.260 or more.

With regard to the measurement method of the above-mentioned loss coefficients, a resonance method in which the measurement is performed around at a resonant frequency is common, and further, a half value method, an attenuation factor method, and a mechanical impedance method may be mentioned. According to the vibration damping composition of the present invention, the loss coefficient of the coating film formed using the vibration damping composition is preferably measured as follows. That is, the vibration damping composition is coated on a cold rolling steel plate (SPCC: 15 mm in width×250 mm in length×1.5 mm in thickness) to form a coating film having a surface density of 4.0 kg/m². The coating film is measured for a loss coefficient by a resonance method (3 dB method) using a cantilever method (product of ONO SOKKI CO., LTD., loss coefficient measurement system).

Examples of the above-mentioned other components include solvent; aqueous cross-linking agent; plasticizer; stabilizer; thickener; wetting agent; antiseptic; foaming inhibitor; filler; coloring agent; dispersant; antirust pigment; defoaming agent; antioxidant; mildew-proofing agent; ultraviolet absorber; and antistatic agent. One or more species of them may be used. Among these, it is preferable that the vibration damping composition includes a filler. It is preferable that the vibration damping composition includes a pigment (a colorant or an antirust pigment).

The above-mentioned other components can be mixed with the above-mentioned emulsion for vibration damping materials and the like using, for example, a butterfly mixer, a planetary mixer, a spiral mixer, kneader, and a dissolver.

Examples of the above-mentioned solvent include ethylene glycol, butyl cellosolve, butyl carbitol, and butyl carbitol acetate. The mixing amount of the solvent may be appropriately determined such that the concentration of the solid content of the emulsion for vibration damping materials in the vibration damping composition is within the above-mentioned range.

Preferred examples of the above-mentioned aqueous cross-linking agent include oxazoline compounds such as EPOCROS WS-500, WS-700, K-2010, 2020, 2030 (trade name, products of NIPPON SHOKUBAI CO., LTD.); epoxy compounds such as ADEKA resin EMN-26-60, EM-101-50 (trade name, products of ADEKA Corp.); melamine compounds such as CYMEL C-325 (trade name, product of Mitsui Cytec Ind.); block isocyanate compounds; zinc oxide compounds such as AZO-50 (trade name, 50% by weight of zinc oxide aqueous dispersant, product of NIPPON SHOKUBAI CO., LTD.). With regard to the mixing amount of the aqueous cross-linking agent, the aqueous cross-linking agent is preferably 0.01 to 20 parts by weight on the solid content equivalent basis relative to 100 parts by weight of the solid content of the emulsion for vibration damping materials, and more preferably 0.15 to 15 parts by weight, and still more preferably 0.5 to 15 parts by weight. The aqueous cross-linking agent may be added into the emulsion for vibration damping materials or may be added together with other components added for forming the vibration damping composition.

If the cross-linking agent is mixed with the above-mentioned emulsion for vibration damping materials or the above-mentioned vibration damping composition, the toughness of the resin can be improved. As a result, sufficiently high vibration damping property is exhibited in a high temperature range. Among these, oxazoline compounds are preferably used.

Polyvinyl alcohols, cellulose derivatives, and polycarboxylic acid resins may be mentioned as the above-mentioned thickener, for example. With regard to the mixing amount of the thickener, the thickener is preferably 0.01 to 2 parts by weight on the solid content equivalent basis relative to 100 parts by weight of the solid content of the emulsion for vibration damping materials, and it is more preferably 0.05 to 1.5 parts by weight, and still more preferably 0.1 to 1 part by weight.

Examples of the above-mentioned filler include inorganic fillers such as calcium carbonate, kaolin, silica, talc, barium sulfate, alumina, iron oxide, titanium oxide, glass powders, magnesium carbonate, aluminum hydroxide, talc, kieselguhr, and clay; flaky inorganic fillers such as glass flakes and mica; and filamentous inorganic fillers such as metal oxide whiskers, glass fibers. The mixing amount of the above-mentioned inorganic filler is preferably 50 to 700 parts by weight, relative to 100 parts by weight of the solid content of the emulsion for vibration damping materials, for example. The mixing amount of the inorganic filler is more preferably 100 to 550 parts by weight.

Organic or inorganic coloring agents such as titanium oxide, carbon black, red iron oxide, Hansa yellow, benzine yellow, copper phthalocyanine blue, and quinacridone red may be mentioned as the above-mentioned coloring agent, for example.

Inorganic dispersants such as sodium hexametaphosphate and sodium tripolyphosphate and organic dispersants such as polycarboxylic acid dispersants may be mentioned as the above-mentioned dispersant, for example.

Metal salts of phosphoric acid, metal salts of molybdic acid, and metal salts of boric acid may be mentioned as the above-mentioned antirust pigment.

Silicone antifoaming agents may be mentioned as the above-mentioned antifoaming agent, for example.

A foaming agent is preferably used as the above-mentioned other components. In this case, it is preferable that the above-mentioned vibration damping composition is dried by heating to form a vibration damping coating film, as mentioned below. If the above-mentioned emulsion for vibration damping materials further contains a foaming agent, the vibration damping material has a uniform foaming structure and it can be formed to have a larger thickness, and thereby sufficient thermal drying property or high vibration damping property is exhibited. Thus, the preferable embodiments of the present invention include a vibration damping composition containing the emulsion for vibration damping materials of the present invention and a foaming agent. The vibration damping composition may further contain other components, if needed.

Preferable examples of the above-mentioned foaming agent include low-boiling hydrocarbon-containing thermal expansion microcapsules, organic foaming agents, and inorganic foaming agents. One or more species of them may be used. Examples of the thermal expansion microcapsules include Matsumoto Microsphere F-30, F-50 (products of Matsumoto Yushi-Seiyaku Co., Ltd.); and EXPANCEL WU642, WU551, WU461, DU551, DU401 (product of Japan Expancel Co., Ltd.). Examples of the organic foaming agent include azodicarbonamide, azobisisobutyronitrile, N,N-dinitrosopentamethylenetetramine, p-toluenesulfonylhydrazine, and p-oxybis(benzenesulfohydrazide). Examples of the inorganic foaming agent include sodium bicarbonate, ammonium carbonate, and silicon hydride.

The mixing amount of the above-mentioned foaming agent is preferably 0.5 to 5.0 parts by weight, relative to 100 parts by weight of the emulsion for vibration damping materials, for example. The mixing amount of the foaming agent is more preferably 1.0 to 3.0 parts by weight.

It is also preferable that the above-mentioned vibration damping composition further containing the foaming agent further contains an inorganic pigment, for example. In such a case, the composition can more sufficiently exhibit the above-mentioned thermal drying property or high vibration damping property.

As the above-mentioned inorganic pigment, one or more species of the above-mentioned inorganic coloring agents or inorganic antirust pigments may be used, for example.

The mixing amount of the above-mentioned inorganic pigment is preferably 50 to 700 parts by weight, relative to 100 parts by weight of the emulsion for vibration damping materials. More preferably, the mixing amount of the inorganic pigment is 100 to 550 parts by weight.

As the above-mentioned other components, a polyvalent metal compound also may be used. In this case, attributed to the polyvalent metal compound, the polyvalent metal compound improves the stability, dispersibility, thermal drying property of the vibration damping composition or the vibration damping property of the vibration damping material formed using the vibration damping composition. The polyvalent metal compound is not especially limited. Examples thereof include zinc oxide, zinc chloride, and zinc sulfate. One or more species of them may be used.

With regard to the form of the above-mentioned polyvalent metal compound, the polyvalent metal compound may be in the form of a powder, an aqueous dispersion, an emulsified dispersion, or the like. Among these, the polyvalent metal compound is preferably used in the form of an aqueous dispersion or an emulsified dispersion, and more preferably in the form of an emulsified dispersion because the dispersibility in the vibration damping composition is improved. With regard to the use amount of the polyvalent metal compound, the polyvalent metal compound is preferably 0.05 to 5.0 parts by weight relative to 100 parts by weight of the solid content in the vibration damping composition, and it is more preferably 0.05 to 3.5 parts by weight.

The above-mentioned vibration damping composition is coated on a substrate and dried to give a coating film serving as a vibration damping material. The substrate is not especially limited. With regard to the method of coating the substrate with the vibration damping composition, brush, spatula, air spray gun, airless spray gun, mortar gun, texture gun, and the like, may be used for coating.

The coating amount of the above-mentioned vibration damping composition may be appropriately determined depending on the intended application, desired performance, and the like. The coating film after drying preferably has a thickness of 0.5 to 8.0 mm, and more preferably 3.0 to 6.0 mm.

It is also preferable that the coating film after drying has a surface density of 1.0 to 7.0 kg/m$^2$. The surface density is more preferably 2.0 to 6.0 kg/m$^2$. Use of the vibration damping composition of the present invention makes it possible to obtain a coating film which hardly generates blisters or cracks at the time of drying and hardly sags on the inclined surface.

Thus, a method of coating the vibration damping composition in such a way that the coating film during drying has a thickness of 0.5 to 8.0 mm and then dried or a method of coating the vibration damping composition in such a way that the coating film after drying has a surface density of 2.0 to 6.0 kg/m$^2$ and then dried are included in the preferable embodiments of the present invention. The preferable embodiments of the present invention also include a vibration damping material obtainable by the above-mentioned method of coating the vibration damping composition.

Regarding the conditions when the coating film is formed by coating and drying the above-mentioned vibration damping composition, the coated vibration damping composition may be dried by heating or at atmospheric temperature. The vibration damping composition in the present invention is excellent in thermal drying property. Therefore, in view of efficiency, it is preferable that the vibration damping composition is dried by heating. The temperature at which the composition is dried by heating is preferably 80 to 210° C., and more preferably 110 to 180° C., and still more preferably 120 to 170° C.

With regard to application of the vibration damping composition essentially including the emulsion for vibration damping materials of the present invention, it can exhibit excellent thermal drying property and vibration damping property. Therefore, such a composition can be preferably used beneath cabin floors of automobiles or applied to rolling stock, ships, aircraft, electric machines, buildings, and construction machines, among other applications.

Effect of the Invention

The emulsion for vibration damping materials of the present invention, which is obtainable by emulsion polymerization using an anionic emulsifier and which includes an emulsion having an average particle diameter of 100 to 450 nm, has the above-mentioned configuration. Such an emulsion for vibration damping materials is excellent in vibration damping property in a wide temperature range, drying property, and mechanical stability, and also it can improve skinning property of the coating film surface. Further, if the emulsion for vibration damping materials is coated on the vertical surface and dried by heating at a high temperature, the collapse of the coating film such as sag of the coating film is sufficiently suppressed, and thereby an excellent coating film can be formed. Therefore, such an emulsion for vibration damping materials can be preferably used beneath cabin floors of automobiles and so applied to rolling stock, ships, aircraft, electric machines, buildings, and construction machines, among other applications.

The emulsion for vibration damping materials of the present invention, which is obtainable by emulsion polymerization using the reactive emulsion and which includes the emulsion having an average particle diameter of 100 to 450 nm, has the above-mentioned configuration. Such an emulsion for vibration damping materials is excellent in vibration damping property and heat drying property, and hardly changed with time, and further it improves the stability and dispersibility of the composition. Further, even if such an emulsion is coated on an inclined object, the emulsion can be uniformly coated and dried to form an excellent coating film. Therefore, such an emulsion for vibration damping materials can form a coating film which exhibits an excellent vibration damping property even on the inclined surface.

The emulsion for vibration damping materials of the present invention, which includes acrylic emulsion particles each having a core part and a shell part, obtainable by polymerizing the monomer component essentially containing the monomer having a Q value of 0.6 to 1.4 and an e value of −0.4 to −1.2 m has the above-mentioned configuration. Such an emulsion exhibits a high vibration damping property in a wide temperature region and it is excellent in mechanical stability and low-temperature storage stability. Further, such an emulsion can be preferably used as a raw material for vibration damping materials used to prevent vibration and noise of various structures.

BEST MODE FOR CARRYING OUT THE INVENTION

The present invention is described in more detail with reference to Examples below, but the present invention is not limited to only these Examples. The terms, "part(s)" and "%" represent "part (s) by weight" and "% by weight", respectively, unless otherwise specified.

Various physical properties and the like are evaluated as follows in the following Examples.

"Tg"

Based on the constitutional components and the proportions thereof in the monomer component at each stage, the Tg was calculated from the above-mentioned Fox formula. The Tg calculated based on the constitutional components and the proportions thereof in the monomer component at all stages was described as a "total Tg."

The Tg value of each homopolymer which was used to calculate the glass transition temperature (Tg) of the polymerizable monomer component from the Fox formula was shown below.

Styrene (St): 100° C.
Methyl methacrylate (MMA): 105° C.
2-ethylhexyl acrylate (2EHA): −70° C.
Acrylic acid (AA): 95° C.
Methacrylic acid (MAA): 130° C.
N-butyl methacrylate (n-BMA): 20° C.
Butyl acrylate (BA): −56° C.
Glycidyl methacrylate (GMA): 55° C.
Hydroxyethyl methacrylate (HEMA): 40° C.

"Nonvolatile Content (NV)"

The obtained aqueous resin dispersant about 1 g was weighed and dried in a hot air dryer at 110° C. for 1 hour. Then, the residue amount after drying was measured as a nonvolatile content and expressed as % by weight relative to the weight before drying.

"pH"

The pH value at 25° C. was measured using a pH meter ("F-23", product of HORIBA, Ltd.).

"Viscosity"

The viscosity was measured at 25° C. and 20 rpm using a B type rotary viscometer.

"Minimum Film-formation Temperature"

The obtained aqueous resin dispersant was coated on a glass plate placed on a heat gradient test apparatus using an applicator which gives a 0.2 mm thick film. Then, the coated film was dried and measured for a temperature when cracks were generated on the coating film. The temperature was defined as a minimum film-formation temperature (MFT).

"Average Particle Diameter, Particle Size Distribution"

The volume average particle diameter was measured by a dynamic light scattering method using a particle size distribution analyzer ("NICOMP Model 380", product of Particle Sizing Systems).

The value obtained by dividing standard deviation by the volume average particle diameter (standard deviation/volume average particle diameter×100) was calculated as a particle size distribution.

"Reactivity 1"

After completion of the initial polymerization where a part of the monomer emulsion was used, that is, just before addition of the rest of the monomer emulsion, the reactant was sampled and measured for solid content. Then, the ratio of the measured solid content relative to a theoretical solid content calculated from a charged amount of starting materials used for the initial polymerization was expressed as % by weight.

If an emulsion having a core part and a shell part was produced through multi-stage polymerization, after completion of the initial polymerization where a part of the monomer emulsion was used to form the core part, that is, just before addition of the rest of the monomer emulsion for forming the core part, the reactant was sampled and measured for solid content. Then, the ratio of the measured solid content relative to a theoretical solid content calculated from a charged amount of starting materials used for the initial polymerization was expressed as % by weight. The ratio was defined as reactivity.

"Reactivity 2"

If an emulsion having a core part and a shell part was produced through multi-stage polymerization, the reactant was sampled thirty minutes later after completion of the polymerization at the first stage where the core part was formed, and then the sampled reactant was measured for solid content. Then, the ratio of the measured solid content relative to a theoretical solid content calculated from a charged amount of starting materials used for the polymerization at the first stage was expressed as % by weight. The reaction was defined as reactivity.

"Weight Average Molecular Weight"

The weight average molecular weight was measured by GPC (gel permeation chromatography) under the following measurement conditions.

Measurement apparatus: HLC-8120GPC (trade name, product of TOSOH CORP.)
Molecular weight column: serially connected TSK-GEL, GMHXL-L, and TSK-GELG5000HXL (products of TOSOH CORP.)
Eluent: Tetrahydrofuran (THF)
Standard substance for calibration curve: Polystyrene (product of TOSOH CORP.)
Measurement method: A measurement object was dissolved in THF such that the solid content accounts for about 0.2% by weight, and the mixture was filtered and the obtained substance as a measurement sample was measured for molecular weight.

"Mechanical Stability"

Purified water 30 g was added to the vibration damping composition 100 g and the mixture was stirred and mixed enough. The mixture was filtered through a 100 metal mesh. Then, the filtered mixture 70 g was subjected to mechanical stability test using Maron stability tester (produced by KUMAGAI RIKI KOGYO CO., LTD.) (according to JIS K6828: 1996, platform scale 10 kg, disk rotation frequency 1000 min−1, rotation time 5 minutes, test temperature 25° C.). After the test, the vibration damping composition was filtered through a 100 metal mesh, and dried in an oven at 110° C. for 1 hour. The obtained substance was measured for aggregation ratio from the following formula and evaluated.

Aggregation ratio(%)=(weight (g) of metal mesh after drying−weight (g) of metal mesh before drying)/ 70(g)×100

Evaluation Standards
Excellent: less than 0.0001%
Good: 0.0001% or more and less than 0.001%
Average: 0.001% or more and less than 0.01%
Poor: 0.01% or more and less than 0.1%

"Surface State of Dried Coating Film"

The prepared vibration damping composition was coated on a steel plate (trade name SPCC-SD with 75 mm in width, 150 mm in length, and 0.8 mm in thickness, product of Nippon Testpanel Co., Ltd.) to have a thickness of 3 mm. Then, the coated film was dried in a hot air dryer at 150° C. for 30 minutes. The surface state of the obtained dried coating film was evaluated based on the following standards.

Evaluation Standards
Good: No defects were observed.
Average: Cracks on the surface or interface were observed.
Bad: The coating film state could not be maintained.

"Test for Resistance to Coating Film Collapsibility"

On a steel plate (ED steel plate) with 0.8×70×150 which was electrodeposited with a cationic electrodeposition coating material ELECRON "KG-400" produced by Kansai Paint Co., Ltd., the coating material composition obtained above was coated to have a wet thickness of 6 mm. Immediately, the coated surface was vertically inclined and subjected to baking at 120° C. for 30 minutes. The obtained coating film was observed by eyes and evaluated for resistance to collapsibility.

Evaluation Standards
The distance (mm) of the coating material collapsed from the top end of the coating surface.
Excellent: 0 mm
Good: 1 to 2 mm
Average: 3 to 5 mm
Poor: 6 mm or more "Test for Coating Film-drying Property on Inclined Surface"

On a steel plate (ED steel plate) with 0.8×70×150 which was electrodeposited with a cationic electrodeposition coating material ELECRON "KG-400" produced by Kansai Paint Co., Ltd., the coating material composition obtained above was coated to have a wet thickness of 6 mm. Immediately, the coated plate was fixed to a tilting table. The tilting table had an inclined angle of about 45°, and below the tilting table, a vibrator (product of YAMATO SCIENTIFIC CO., LTD., TOUCH MIXER MT-31) was attached. Then, the coated plate was subjected to a vibration (60 Hz) test at a room temperature for 3 minutes. In such procedures, the coating film retention was observed, and thereby the coating film-drying property on the inclined surface was evaluated.

Evaluation Standards
The distance (mm) of the coating material sagged from the lower end of the coating surface.
Good: 0 to 15 mm
Average: 16 to 20 mm
Bad: More than 20 mm "Test for Low-temperature Storage Stability"

(1) The sample emulsion 200 g was weight and charged into a 225 cc mayonnaise bottle and the bottle was sealed.
(2) Then, the bottle was placed in a temperature-controllable thermostat box at −8° C. for 16 hours. After that, the bottle was left at a room temperature for 8 hours and the emulsion inside the bottle was observed.
The evaluation standards are shown below.
Good: The emulsion was not frozen.
Average: The emulsion was frozen after kept at −8° C. for 16 hours but melted after kept at a room temperature for 8 hours.
Bad: The emulsion was not melted "Appearance of Coating Film"

The prepared vibration damping composition was coated on a steel plate (trade name SPCC-SD with 75 mm in width, 150 mm in length, and 0.8 mm in thickness) to have a thickness of 3 mm. The coated film was dried in a hot air dryer at 150° C. for 30 minutes. The surface state of the obtained dried coating film was evaluated for blisters and cracks based on the following standards.

Evaluation Standards
Excellent: No defects were observed.
Good: Slightly blister and peeling were observed.
Average: Blister and peeling were observed.
Bad: The coating film state could not be maintained.
"Vibration Damping Property Test"

The above-mentioned vibration damping composition was coated on a cold rolling steel plate (SPCC: 15 in width×250 in length×1.5 mm in thickness) to have a thickness of 3 mm. The coated composition was dried at 150° C. for 30 minutes. As a result, a vibration damping coating film having a surface density of 4.0 kg/m$^2$ was formed on the cold rolling steel plate. The coating film was measured for vibration damping property as follows: the loss coefficient at the respective temperatures (20° C. to 60° C.) were measured by a resonance method (3 dB method) using a cantilever method (product of ONO SOKKI CO., LTD., loss coefficient measurement system).

Emulsions for vibration damping materials (1) of the present invention, prepared using an anionic emulsifier and/or a reactive emulsifier, were tested, first.

EXAMPLE 1

A polymerization vessel equipped with a stirrer, a reflux condenser, a thermometer, a nitrogen inlet tube and a dropping funnel was filled with deionized water 339 parts. Then, the internal temperature was increased to 75° C. under stirring and nitrogen flow. The above-mentioned dropping funnel was filled with a monomer emulsion composed of styrene 505 parts, 2-ethylhexyl acrylate 135.0 parts, butyl acrylate 350 parts, acrylic acid 10.0 parts, t-dodecylmercaptan 4.0 parts, a previously adjusted 20% aqueous solution of NEWCOL 707SF (trade name, product of Nippon Nyukazai Co., Ltd., polyoxyethylene polycyclic phenyl ether ammonium sulfate) 180.0 parts and deionized water 164.0 parts. While the internal temperature of the polymerization vessel was maintained at 75° C., the above-mentioned monomer emulsion 27.0 parts and a 5% aqueous solution of potassium persulfate 5 parts and a 22% aqueous solution of sodium hydrogen sulfite 10 parts were added, thereby being subjected to initial polymerization. Forty minutes later, while the inside of the reaction system was maintained at 80° C., the rest of the monomer emulsion was uniformly added dropwise for 210 minutes. Simultaneously, a 5% aqueous solution of potassium persulfate 95 parts and a 2% aqueous solution of sodium hydrogen sulfite 90 parts were uniformly added dropwise for 210 minutes. After completion of the dropwise addition, the temperature was maintained for 60 minutes, and the polymerization was completed.

The obtained reaction liquid was cooled to a room temperature, and then thereinto, 2-dimethylethanolamine 16.7 parts was added. As a result, an emulsion for vibration damping materials 1 was prepared.

The obtained aqueous resin dispersant was measured for solid content, pH, viscosity, MFT, average particle diameter, particle size distribution, and weight average molecular weight by the above-mentioned methods, respectively. Then, the measurement results are shown in Table 1. The measurement results obtained in Examples 2 to 15 and Comparative Examples 1 to 3 are also shown in Tables 1 and 2.

EXAMPLE 2

An emulsion for vibration damping materials 2 was prepared in the same manner as in Example 1, except that ABEX 26-S (trade name, product of Rhodia Nikka Co., Ltd., polyoxyethylene alkyl phenyl ether sulfate) was used instead of the emulsifier NEWCOL 707SF.

EXAMPLE 3

An emulsion for vibration damping materials 3 was prepared in the same manner as in Example 1, except that LATEMUL WX (trade name, product of Kao Corp., polyoxyethylene oleyl ether sulfate) was used instead of the emulsifier NEWCOL 707SF.

EXAMPLE 4

An emulsion for vibration damping materials 4 was prepared in the same manner as in Example 1, except that LATEMUL A-E60 (trade name, product of Kao Corp., polyoxyethylene polycyclic phenyl ether sulfate) was used instead of the emulsifier NEWCOL 707SF.

EXAMPLE 5

An emulsion for vibration damping materials 5 was prepared in the same manner as in Example 1, except that Hitenol NF-08 (trade name, product of DAI-ICHI KOGYO SEIYAKU CO., LTD., polyoxyethylene alkyl ether sulfate) was used instead of the emulsifier NEWCOL 707SF.

EXAMPLE 6

A polymerization vessel equipped with a stirrer, a reflux condenser, a thermometer, a nitrogen inlet tube and a dropping funnel was filled with deionized water 339 parts. Then, the internal temperature was increased to 75° C. under stirring and nitrogen flow. The above-mentioned dropping funnel was filled with a monomer emulsion at the first stage, composed of styrene 275 parts, 2-ethylhexyl acrylate 135.0 parts, acrylic acid 5.0 parts, t-dodecylmercaptan 2.0 parts, a previously adjusted 20% aqueous solution of LATEMUL WX 72.0 parts and deionized water 66.0 parts. While the internal temperature of the polymerization vessel was maintained at 75° C., the above-mentioned monomer emulsion 27.0 parts and a 5% aqueous solution of potassium persulfate 5 parts and a 2% aqueous solution of sodium hydrogen sulfite 10 parts were added, thereby being subjected to initial polymerization. Forty minutes later, while the inside of the reaction system was maintained at 80° C., the rest of the monomer emulsion was uniformly added dropwise for 90 minutes. Simultaneously, a 5% aqueous solution of potassium persulfate 35 parts and a 2% aqueous solution of sodium hydrogen sulfite 30 parts are uniformly added dropwise for 90 minutes. After completion of the dropwise addition, the temperature was maintained for 60 minutes, and the polymerization at the first stage was completed.

Successively, a monomer emulsion at the second stage, composed of styrene 230.0 parts, butyl acrylate 350.0 parts, acrylic acid 5.0 parts, t-dodecylmercaptan 2.0 parts, a previously adjusted 20% aqueous solution of LATEMUL WX 108.0 parts, and deionized water 98.0 parts was uniformly added dropwise at 80° C. for 120 minutes. Simultaneously, a 5% aqueous solution of potassium persulfate 60 parts and a 2% aqueous solution of sodium hydrogen sulfite 60 parts were uniformly added dropwise for 120 minutes. After completion of the dropwise addition, the temperature was maintained for 60 minutes, and thereby the polymerization at the second stage was completed.

The obtained reaction liquid was cooled to a room temperature, and thereto, 2-dimethylethanolamine-16.7 parts was added. As a result, an emulsion for vibration damping materials 6 was obtained.

EXAMPLE 7

An emulsion for vibration damping materials 7 was obtained in the same manner as in Example 6, except that 24 parts out of 72.0 parts of the 20% aqueous solution of LATEMUL WX at the first stage and 36.0 parts out of 108.0 parts of the 20% aqueous solution of LATEMUL WX at the second stage were replaced with a 20% aqueous solution of EMULGEN 1118S (trade name, product of Kao Corp., polyoxyethylene alkyl ether (ethylene oxide 18 mol adduct)).

EXAMPLE 8

An emulsion for vibration damping materials 8 was obtained in the same manner as in Example 6, except that 10 parts out of 72.0 parts of the 20% aqueous solution of LATEMUL WX as the emulsifier component was charged for the initial polymerization without charging the monomer emulsion at the first stage 27.0 parts into the polymerization container; methyl methacrylate was used instead of the styrene contained in the monomer component at the first stage; and methyl methacrylate 170.0 parts, butyl acrylate 310.0 parts, and n-butyl methacrylate 100.0 parts were used instead of the styrene 230 parts and the butyl acrylate 350.0 parts in the monomer component at the second stage.

EXAMPLE 9

An emulsion or vibration damping materials 9 was prepared in the same manner as in Example 1, except that a 20% aqueous solution of Hitenol N-08 (trade name, product of DAI-ICHI KOGYO SEIYAKU CO., LTD., polyoxyethylenenonylphenyl ether sulfonate) 120 parts and a 20% aqueous solution of Nonipol 200 (trade name, product of Sanyo Chemical Industries Co., Ltd., polyoxyethylene nonylphenol ether) 60.0 parts were used instead of the emulsifier NEWCOL 707SF.

EXAMPLE 10

An emulsion for vibration damping materials 10 was prepared in the same manner as in Example 10, except that the deionized water charged into the polymerization vessel was changed from 339 parts to 224 parts and the 20% aqueous solution of NEWCOL 707SF was changed from 180.0 parts to 360.0 parts.

EXAMPLE 11

An emulsion for vibration damping materials 11 was prepared in the same manner as in Example 1, except that styrene 504 parts, 2-ethylhexyl acrylate 134.0 parts, butyl acrylate 350 parts, and methacrylic acid 14.0 parts were charged into the dropping funnel instead of the styrene 505 parts, the 2-ethylhexyl acrylate 135.0 parts, the butyl acrylate 350 parts, and the acrylic acid 10.0 parts.

EXAMPLE 12

An emulsion for vibration damping materials 12 was prepared in the same manner as in Example 1, except that Hitenol N-08 was used instead of the emulsifier NEWCOL 707SF.

EXAMPLE 13

An emulsion for vibration damping materials 13 was prepared in the same manner as in Example 1, except that styrene 506 parts, 2-ethylhexyl acrylate 136.0 parts, butyl acrylate 350 parts, and acrylic acid 8.0 parts were charged into the dropping funnel instead of the styrene 505 parts, the 2-ethylhexylacrylate 135.0 parts, the butyl acrylate 350 parts, and the acrylic acid 10.0 parts.

EXAMPLE 14

An emulsion for vibration damping materials 14 was prepared in the same manner as in Example 1, except that styrene 503 parts, 2-ethylhexyl acrylate 134.0 parts, butyl acrylate 350 parts, and acrylic acid 13.0 parts were charged into the dropping funnel instead of the styrene 505 parts, the 2-ethylhexyl acrylate 135.0 parts, the butyl acrylate 350 parts, and the acrylic acid 10.0 parts.

EXAMPLE 15

An emulsion for vibration damping materials 15 was obtained in the same manner as in Example 1, except that styrene 507 parts, 2-ethylhexyl acrylate 137.0 parts, butyl acrylate 350 parts, and acrylic acid 6.0 parts were charged into the dropping funnel instead of the styrene 505 parts, the 2-ethylhexyl acrylate 135.0 parts, the butyl acrylate 350 parts, and the acrylic acid 10.0 parts.

COMPARATIVE EXAMPLE 1

A comparative emulsion for vibration damping materials 1 was prepared in the same manner as in Example 1, except that the firstly charged monomer emulsion 27.0 parts was changed to 2.7 parts.

COMPARATIVE EXAMPLE 2

A comparative emulsion for vibration damping materials 2 was prepared in the same manner as in Example 1, except that the monomer emulsion 1348.0 parts, and simultaneously a 5% aqueous solution of potassium persulfate 40 parts and a 2% aqueous solution of sodium hydrogen sulfite 40 parts were uniformly added dropwise for 150 minutes in the reaction system at 80° C., without adding the monomer emulsion 27.0 parts, the 5% aqueous solution of potassium persulfate 5 parts and the 2% aqueous solution of sodium hydrogen sulfite 10 parts in the polymerization vessel at an internal temperature of 75° C.

COMPARATIVE EXAMPLE 3

A comparative emulsion for vibration damping materials 3 was prepared in the same manner as Example 1, except that the sodium hydrogen sulfite was not used.

COMPARATIVE EXAMPLE 4

A comparative emulsion for vibration damping materials 4 was prepared in the same manner as in Example 1, except that the deionized water charged into the polymerization vessel was changed from 339 g to 833 g; the 20% aqueous solution of NEWCOL 707SF 70 g was charged; and the firstly charged monomer emulsion was changed from 27.0 parts to 134.8 parts.

Preparation of Vibration Damping Composition

Vibration damping compositions were prepared using the emulsions for vibration damping materials obtained in Examples 1 to 15 and Comparative Examples 1 to 4 at the following proportions, and evaluated for mechanical stability, surface state of dried coating film, resistance to coating film collapsibility, and vibration damping property. Tables 1 and 2 show the results.

| | |
|---|---|
| Acrylic copolymer emulsion | 359 parts |
| Calcium carbonate NN#200*[1] | 620 parts |
| Dispersant AQUALIC DL-40S*[2] | 6 parts |
| Thickener ACRYSET WR-650*[3] | 4 parts |
| Antifoaming agent NOPCO 8034L*[4] | 1 part |
| Foaming agent F-30*[5] | 6 parts |

*[1]filler, product of NITTO FUNKA KOGYO K.K.
*[2]speciality polycarboxylic acid dispersant (active component 44%), product of NIPPON SHOKUBAI CO., LTD.
*[3]alkali-soluble acrylic thickener (active component 30%), product of NIPPON SHOKUBAI CO., LTD.
*[4]defoaming agent (main component: hydrophobic silicon + mineral oil), product of SAN NOPCO, Ltd.
*[5]foaming agent, product of Matsumoto Yushi-Seiyaku Co., Ltd.

TABLE 1

| | | | Example | | | | |
|---|---|---|---|---|---|---|---|
| | | | 1 | 2 | 3 | 4 | 5 |
| Number of moles of all of monomers | | | 8.46 | 8.46 | 8.46 | 8.46 | 8.46 |
| Number of moles of neutralized carboxyl group monomer (mol) | | | 0.14 | 0.14 | 0.14 | 0.14 | 0.14 |
| Amount of neutralized carboxyl group (mol %) | | | 1.65 | 1.65 | 1.65 | 1.65 | 1.65 |
| Calculation Tg | Tg at 1st stage | | 0 | 0 | 0 | 0 | 0 |
| | Tg at 2nd stage | | — | — | — | — | — |
| | Total Tg | | 0 | 0 | 0 | 0 | 0 |
| | ΔTg | | — | — | — | — | — |
| Characteristic value | NV (%) | | 54.9 | 54.8 | 54.7 | 54.9 | 55.0 |
| | pH | | 8.1 | 8.2 | 8.2 | 8.2 | 8.3 |
| | Viscosity (mPa·s) | | 460 | 60 | 210 | 410 | 1700 |
| | MFT (° C.) | | 4 | 1 | 2 | 3 | 3 |
| | Average particle diameter (nm) | | 230 | 440 | 280 | 170 | 110 |
| | Particle size distribution (%) | | 24 | 25 | 11 | 17 | 18 |
| | Reactivity 1 (%) | | 94 | 90 | 93 | 95 | 97 |
| | Reactivity 2 (%) | | — | — | — | — | — |
| | Weight average molecular weight | | 49000 | 50000 | 60000 | 55000 | 70000 |
| | Mechanical stability | | Good | Excellent | Excellent | Excellent | Excellent |
| | Surface state of dried coating film | | Good | Good | Good | Good | Good |
| | Resistance to coating film collapsibility | | Good | Good | Good | Excellent | Good |
| | Vibration damping property | 20° C. | 0.078 | 0.079 | 0.081 | 0.076 | 0.077 |
| | (loss coefficient) | 40° C. | 0.131 | 0.132 | 0.129 | 0.130 | 0.133 |
| | | 60° C. | 0.025 | 0.019 | 0.018 | 0.020 | 0.019 |
| | Total loss coefficients | | 0.234 | 0.230 | 0.228 | 0.226 | 0.229 |

| | | | Example | | | |
|---|---|---|---|---|---|---|
| | | | 6 | 7 | 8 | 9 |
| Number of moles of all of monomers | | | 8.46 | 8.46 | 8.46 | 8.46 |
| Number of moles of neutralized carboxyl group monomer (mol) | | | 0.14 | 0.14 | 0.14 | 0.14 |
| Amount of neutralized carboxyl group (mol %) | | | 1.65 | 1.65 | 1.65 | 1.65 |
| Calculation Tg | Tg at 1st stage | | 20 | 20 | 22 | 0 |
| | Tg at 2nd stage | | −12 | −12 | −11 | — |
| | Total Tg | | 0 | 0 | 2 | 0 |
| | ΔTg | | 32 | 32 | 33 | — |
| Characteristic value | NV (%) | | 54.8 | 54.7 | 55.0 | 55.0 |
| | pH | | 8.2 | 8.3 | 8.3 | 8.2 |
| | Viscosity (mPa·s) | | 330 | 100 | 910 | 380 |
| | MFT (° C.) | | 9 | 6 | 8 | 3 |
| | Average particle diameter (nm) | | 230 | 350 | 220 | 275 |
| | Particle size distribution (%) | | 11 | 22 | 17 | 18 |
| | Reactivity 1 (%) | | 96 | 92 | 99 | 90 |
| | Reactivity 2 (%) | | 97 | 94 | 99 | — |
| | Weight average molecular weight | | 55000 | 59000 | 66000 | 65000 |
| | Mechanical stability | | Excellent | Excellent | Good | Excellent |
| | Surface state of dried coating film | | Good | Good | Good | Good |
| | Resistance to coating film collapsibility | | Excellent | Good | Excellent | Bad |
| | Vibration damping property | 20° C. | 0.071 | 0.074 | 0.073 | 0.078 |
| | (loss coefficient) | 40° C. | 0.139 | 0.138 | 0.139 | 0.119 |
| | | 60° C. | 0.059 | 0.058 | 0.063 | 0.011 |
| | Total loss coefficients | | 0.269 | 0.270 | 0.275 | 0.208 |

TABLE 2

|  |  | Example | | | | | |
|---|---|---|---|---|---|---|---|
|  |  | 10 | 11 | 12 | 13 | 14 | 15 |
| Number of moles of all of monomers | | 8.46 | 8.47 | 8.46 | 8.45 | 8.48 | 8.43 |
| Number of moles of neutralized carboxyl group monomer (mol) | | 0.14 | 0.16 | 0.14 | 0.11 | 0.18 | 0.08 |
| Amount of neutralized carboxyl group (mol %) | | 1.65 | 1.89 | 1.65 | 1.30 | 2.12 | 0.98 |
| Calculation Tg | Tg at 1st stage | 0 | 0 | 0 | 1 | 1 | 1 |
|  | Tg at 2nd stage | — | — | — | — | — | — |
|  | Total Tg | 0 | 0 | 0 | 1 | 1 | 1 |
|  | ΔTg | — | — | — | — | — | — |
| Characteristic value | NV (%) | 55.0 | 55.0 | 54.9 | 54.9 | 54.9 | 54.8 |
|  | pH | 8.3 | 8.0 | 8.1 | 7.8 | 8.7 | 9.1 |
|  | Viscosity (mPa·s) | 1150 | 680 | 310 | 320 | 950 | 680 |
|  | MFT (°C.) | 0 | 1 | 2 | 4 | 4 | 4 |
|  | Average particle diameter (nm) | 120 | 210 | 220 | 310 | 306 | 312 |
|  | Particle size distribution (%) | 31 | 22 | 11 | 29 | 30 | 26 |
|  | Reactivity 1 (%) | 98 | 95 | 94 | 95 | 95 | 96 |
|  | Reactivity 2 (%) | — | — | — | — | — | — |
|  | Weight average molecular weight | 63000 | 50000 | 61000 | 53000 | 53000 | 52000 |
|  | Mechanical stability | Excellent | Good | Excellent | Good | Good | Average |
|  | Surface state of dried coating film | Good | Good | Good | Average | Bad | Bad |
|  | Resistance to coating film collapsibility | Bad | Good | Bad | Bad | Bad | Bad |
|  | Vibration damping property 20° C. | 0.080 | 0.076 | 0.069 | 0.070 | 0.068 | 0.059 |
|  | (loss coefficient) 40° C. | 0.121 | 0.132 | 0.127 | 0.131 | 0.129 | 0.128 |
|  | 60° C. | 0.010 | 0.026 | 0.022 | 0.025 | 0.032 | 0.029 |
| Total loss coefficients | | 0.211 | 0.234 | 0.218 | 0.226 | 0.229 | 0.216 |

|  |  | Comparative Example | | | |
|---|---|---|---|---|---|
|  |  | 1 | 2 | 3 | 4 |
| Number of moles of all of monomers | | 8.46 | 8.46 | 8.46 | 8.46 |
| Number of moles of neutralized carboxyl group monomer (mol) | | 0.14 | 0.14 | 0.14 | 0.14 |
| Amount of neutralized carboxyl group (mol %) | | 1.65 | 1.65 | 1.65 | 1.65 |
| Calculation Tg | Tg at 1st stage | 0 | 0 | 0 | 0 |
|  | Tg at 2nd stage | — | — | — | — |
|  | Total Tg | 0 | 0 | 0 | 0 |
|  | ΔTg | — | — | — | — |
| Characteristic value | NV (%) | 54.7 | 54.6 | 54.4 | 42.8 |
|  | pH | 8.3 | 8.1 | 8.3 | 8.1 |
|  | Viscosity (mPa·s) | 65 | 380 | 410 | 1800 |
|  | MFT (°C.) | 0 | 4 | 3 | 4 |
|  | Average particle diameter (nm) | 465 | 460 | 470 | 95 |
|  | Particle size distribution (%) | 31 | 31 | 35 | 28 |
|  | Reactivity 1 (%) | 76 | — | 83 | 99 |
|  | Reactivity 2 (%) | — | — | — | — |
|  | Weight average molecular weight | 68000 | 54000 | 53000 | 59000 |
|  | Mechanical stability | Excellent | Good | Excellent | Bad |
|  | Surface state of dried coating film | Average | Average | Good | Good |
|  | Resistance to coating film collapsibility | Bad | Bad | Bad | — |
|  | Vibration damping property 20° C. | 0.081 | 0.077 | 0.076 | — |
|  | (loss coefficient) 40° C. | 0.119 | 0.129 | 0.128 | — |
|  | 60° C. | 0.010 | 0.021 | 0.022 | — |
| Total loss coefficients | | 0.210 | 0.227 | 0.226 | 0.000 |

EXAMPLE 16

A polymerization vessel equipped with a stirrer, a reflux condenser, a thermometer, a nitrogen inlet tube and a dropping funnel was filled with deionized water 339 parts. Then, the internal temperature was increased to 75° C. under stirring and nitrogen flow. The above-mentioned dropping funnel was filled with a monomer emulsion composed of styrene 505 parts, 2-ethylhexyl acrylate 135.0 parts, butyl acrylate 350 parts, acrylic acid 10.0 parts, t-dodecylmercaptan 4.0 parts, a previously adjusted 20% aqueous solution of LATEMUL PD-104 (trade name, product of Kao Corp., polyoxyalkylene alkenyl ether sulfate) 180.0 parts and deionized water 164.0 parts. While the internal temperature of the polymerization vessel was maintained at 75° C., the above-mentioned monomer emulsion 27.0 parts and a 5% aqueous solution of potassium persulfate 5 parts and a 2% aqueous solution of sodium hydrogensulfite 10 parts were added, thereby being subjected to initial polymerization. Forty minutes later, while the inside of the reaction system was maintained at 80° C., the rest of the monomer emulsion was uniformly added dropwise for 210 minutes. Simultaneously, a 5% aqueous solution of potassium persulfate 95 parts and a 2% aqueous solution of sodium hydrogen sulfite 90 parts were uniformly added dropwise for 210 minutes. After completion of the dropwise addition, the temperature was maintained for 60 minutes, and the polymerization was completed.

The obtained reaction liquid was cooled to a room temperature, and then thereinto, 2-dimethylethanolamine 16.7 parts were added. As a result, an emulsion for vibration damping materials 16 was prepared.

The obtained aqueous resin dispersant was measured for solid content, pH, viscosity, MFT, average particle diameter, particle size distribution, reactivity, and weight average molecular weight by the above-mentioned methods, respectively. Table 3 shows the kind and the use amount of the polymerizable monomers, and the use amount of the polymerizable monomers is represented by the proportion (% by weight) relative to the total amount of the polymerizable monomers used in the two stages. Similarly, the results in Examples 17 to 27 and Comparative Examples 5 to 8 are shown in Tables 3 and 4.

EXAMPLE 17

An emulsion for vibration damping materials 17 was prepared in the same manner as in Example 16, except that ADEKA-REASOAP SR-10 (trade name, product of ADEKA Corp., allyloxymethyl alkoxyethyl polyoxyethylene sulfate) was used instead of the emulsifier LATEMUL PD-104.

EXAMPLE 18

An emulsion for vibration damping materials 18 was prepared in the same manner as in Example 16, except that AQUALON KH-10 (trade name, product of DAI-ICHI KOGYO SEIYAKU CO., LTD., allyloxymethyl alkyloxy polyoxyethylene sulfate) was used instead of the emulsifier LATEMUL PD-104.

EXAMPLE 19

An emulsion for vibration damping materials 19 was prepared in the same manner as in Example 16, except that ANTOX MS-60 (trade name, product of Nippon Nyukazai Co., Ltd., bis(polyoxyethylene polycyclic phenyl ether)methacrylated sulfonate) was used instead of the emulsifier LATEMUL PD-104.

EXAMPLE 20

An emulsion for vibration damping materials 20 was prepared in the same manner as in Example 16, except that ADEKA-REASOAP SR-30 (trade name, product of ADEKA Corp., allyloxymethyl alkoxy ethyl polyoxyethylene sulfate) was used instead of the emulsifier LATEMUL PD-104.

EXAMPLE 21

A polymerization vessel equipped with a stirrer, a reflux condenser, a thermometer, a nitrogen inlet tube and a dropping funnel was filled with deionized water 339 parts. Then, the internal temperature was increased to 75° C. under stirring and nitrogen flow. The above-mentioned dropping funnel was filled with a monomer emulsion at the first stage, composed of styrene 275 parts, 2-ethylhexyl acrylate 135.0 parts, acrylic acid 5.0 parts, t-dodecylmercaptan 2.0 parts, 72.0 parts of a previously adjusted 20% aqueous solution of ADEKA-REASOAP SR-30, and deionized water 66.0 parts. While the internal temperature of the polymerization vessel was maintained at 75° C., the above-mentioned monomer emulsion 27.0 parts and a 5% aqueous solution of potassium persulfate 5 parts and a 2% aqueous solution of sodium hydrogen sulfite 10 parts were added, thereby being subjected to initial polymerization. Forty minutes later, while the inside of the reaction system was maintained at 80° C., the rest of the monomer emulsion was uniformly added dropwise for 90 minutes. Simultaneously, a 5% aqueous solution of potassium persulfate 35 parts and a 2% aqueous solution of sodium hydrogen sulfite 30 parts are uniformly added dropwise for 90 minutes. After completion of the dropwise addition, the temperature was maintained for 60 minutes, and the polymerization at the first stage was completed.

Successively, a monomer emulsion at the second stage, composed of styrene 230.0 parts, butyl acrylate 350.0 parts, acrylic acid 5.0 parts, t-dodecylmercaptan 2.0 parts, 108.0 parts of a previously adjusted 20% aqueous solution of ADEKA-REASOAP SR-30, and deionized water 98.0 parts was uniformly added dropwise at 80° C. for 120 minutes. Simultaneously, a 5% aqueous solution of potassium persulfate 60 parts and a 2% aqueous solution of sodium hydrogen sulfite 60 parts were uniformly added dropwise for 120 minutes. After completion of the dropwise addition, the temperature was maintained for 60 minutes, and thereby the polymerization at the second stage was completed.

The obtained reaction liquid was cooled to a room temperature, and thereto, 2-dimethylethanolamine-16.7 parts was added. As a result, an emulsion for vibration damping materials 21 was obtained.

EXAMPLE 22

An emulsion for vibration damping materials 22 was prepared in the same manner as in Example 21, except that 24 parts out of 72.0 parts of the 20% aqueous solution of ADEKA-REASOAP SR-30 at the first stage and 36.0 parts out of 108.0 parts of the 20% aqueous solution of ADEKA-REASOAP SR-30 at the second stage were replaced with a 20% aqueous solution of EMULGEN 1118S (trade name, product of Kao Corp., polyoxyethylenealkyl ether (ethylene oxide 18 mol adduct)).

EXAMPLE 23

An emulsion for vibration damping materials 23 was prepared in the same manner as in Example 21, except that 10 parts out of 72.0 parts of the 20% aqueous solution of ADEKA-REASOAP SR-30 as the emulsifier component was charged for the initial polymerization without charging the monomer emulsion at the first stage 27.0 parts into the polymerization container; methyl methacrylate was used instead of the styrene contained in the monomer component at the first stage; and methyl methacrylate 170.0 parts, butylacrylate 310.0 parts, and n-butylmethacrylate 100.0 parts were used instead of the styrene 230.0 parts and the butyl acrylate 350.0 parts in the monomer component at the second stage.

EXAMPLE 24

An emulsion for vibration damping materials 24 was prepared in the same manner as in Example 16, except that the deionized water charged into the polymerization vessel was changed from 339 parts to 224 parts and the 20% aqueous solution of LATEMUL PD-104 was changed from 180.0 parts to 360.0 parts.

EXAMPLE 25

An emulsion for vibration damping materials 25 was prepared in the same manner as in Example 16, except that the deionized water charged into the polymerization vessel was changed from 339 parts to 425 parts; the 20% aqueous solution of LATEMUL PD-104 was changed from 180.0 parts to 45.0 parts; and the firstly added monomer emulsion was changed from 27.0 parts to 2.7 parts.

EXAMPLE 26

An emulsion for vibration damping materials 26 was prepared in the same manner as in Example 16, except that Hitenol 18E (trade name, product of DAI-ICHI KOGYO SEIYAKU CO., LTD., polyoxyethylene alkyl ether sulfonate salt) was used instead of the emulsifier LATEMUL PD-104.

EXAMPLE 27

An emulsion for vibration damping materials 27 was prepared in the same manner as in Example 26, except that 60.0 parts out of 180 parts of the 20% aqueous solution of Hitenol 18E was replaced with a 20% aqueous solution of EMULGEN 1118S.

COMPARATIVE EXAMPLE 5

A comparative emulsion for vibration damping materials 5 was prepared in the same manner as in Example 16, except that the firstly charged monomer emulsion was changed from 27.0 parts to 2.7 parts.

COMPARATIVE EXAMPLE 6

A comparative emulsion for vibration damping materials 6 was prepared in the same manner as in Example 16, except that the deionized water charged into the polymerization vessel was changed from 339 parts to 833 parts; 70 parts of a 20% aqueous solution of LATEMUL PD-104 was charged; and the firstly charged monomer emulsion was changed from 27.0 parts to 134.8 parts.

COMPARATIVE EXAMPLE 7

A comparative emulsion for vibration damping materials 7 was prepared in the same manner as in Example 16, except that the monomer emulsion 1348.0 parts, and simultaneously a 5% aqueous solution of potassium persulfate 90 parts and a 2% aqueous solution of sodium hydrogen sulfite 90 parts were uniformly added dropwise for 150 minutes in the reaction system at 80° C., without adding the monomer emulsion 27.0 parts, the 5% aqueous solution of potassium persulfate 5 parts and the 2% aqueous solution of sodium hydrogen sulfite 10 parts in the polymerization vessel at an internal temperature of 75° C.

COMPARATIVE EXAMPLE 8

A comparative emulsion for vibration damping materials 8 was prepared in the same manner as in Example 16, except that the sodium hydrogen sulfite was not used.

Preparation of Vibration Damping Composition

Vibration damping compositions were prepared using the emulsions for vibration damping materials obtained in Examples 16 to 27 and Comparative Examples 5 to 8 at the following proportions, and evaluated for mechanical stability, coating film-drying property on inclined surface, and vibration damping property. Tables 3 and 4 show the results.

| | |
|---|---|
| Acrylic copolymer emulsion | 359 parts |
| Calcium carbonate NN#200*[1] | 620 parts |
| Dispersant AQUALIC DL-40S*[2] | 6 parts |
| Thickener ACRYSET WR-650*[3] | 4 parts |
| Antifoaming agent NOPCO 8034L*[4] | 1 part |
| Foaming agent F-30*[5] | 6 parts |

The above-mentioned *[1] to *[5] are the same as those mentioned above.

TABLE 3

| | | | Example | | | | | | | |
|---|---|---|---|---|---|---|---|---|---|---|
| | | | 16 | 17 | 18 | 19 | 20 | 21 | 22 | 23 |
| Calculation Tg | Tg at 1st stage | | 0 | 0 | 0 | 0 | 0 | 20 | 20 | 22 |
| | Tg at 2nd stage | | — | — | — | — | — | −12 | −12 | −11 |
| | Total Tg | | 0 | 0 | 0 | 0 | 0 | 0 | 0 | 2 |
| | ΔTg | | — | — | — | — | — | 32 | 32 | 33 |
| Characteristic value | NV (%) | | 54.8 | 54.8 | 54.7 | 54.8 | 54.7 | 54.7 | 54.8 | 55.0 |
| | pH | | 8.1 | 8.4 | 8.3 | 8.6 | 8.4 | 8.2 | 8.1 | 8.3 |
| | Viscosity (mPa · s) | | 90 | 165 | 330 | 220 | 280 | 430 | 710 | 920 |
| | MFT (° C.) | | 3 | 3 | 1 | 4 | 2 | 8 | 6 | 9 |
| | Average particle diameter (nm) | | 380 | 125 | 250 | 280 | 340 | 175 | 230 | 210 |
| | Particle size distribution (%) | | 24 | 23 | 11 | 17 | 18 | 11 | 20 | 14 |
| | Reactivity 1 (%) | | 90 | 94 | 93 | 94 | 91 | 97 | 95 | 99 |
| | Reactivity 2 (%) | | — | — | — | — | — | 98 | 96 | 99 |
| | Weight average molecular weight | | 54000 | 63000 | 59000 | 66000 | 55000 | 61000 | 73000 | 88000 |
| | Mechanical stability | | Good | Excellent | Excellent | Good | Excellent | Excellent | Excellent | Good |
| | Coating film-drying property on inclined surface | | Good | Good | Good | Good | Good | Good | Good | Good |
| | Vibration damping property (loss coefficient) | 20° C. | 0.076 | 0.079 | 0.081 | 0.077 | 0.078 | 0.067 | 0.073 | 0.064 |
| | | 40° C. | 0.130 | 0.129 | 0.128 | 0.133 | 0.128 | 0.138 | 0.136 | 0.141 |
| | | 60° C. | 0.020 | 0.019 | 0.022 | 0.021 | 0.022 | 0.061 | 0.057 | 0.070 |
| | Total loss coefficients | | 0.226 | 0.227 | 0.231 | 0.231 | 0.228 | 0.266 | 0.266 | 0.275 |

TABLE 4

|  |  | Example | | | | | Comparative Example | | |
|---|---|---|---|---|---|---|---|---|---|
|  |  | 24 | 25 | 26 | 27 | 5 | 6 | 7 | 8 |
| Calculation Tg | Tg at 1st stage | 0 | 0 | 0 | 0 | 0 | 0 | 0 | 0 |
|  | Tg at 2nd stage | — | — | — | — | — | — | — | — |
|  | Total Tg | 0 | 0 | 0 | 0 | 0 | 0 | 0 | 0 |
|  | ΔTg | — | — | — | — | — | — | — | — |
| Characteristic value | NV (%) | 54.9 | 54.6 | 54.7 | 54.8 | 54.6 | 42.9 | 54.6 | 54.0 |
|  | pH | 8.3 | 8.1 | 8.1 | 8.3 | 8.2 | 8.1 | 8.3 | 8.4 |
|  | Viscosity (mPa·s) | 810 | 70 | 660 | 410 | 60 | 2150 | 50 | 100 |
|  | MFT (° C.) | 1 | 3 | 4 | 2 | 3 | 2 | 0 | 1 |
|  | Average particle diameter (nm) | 140 | 410 | 270 | 260 | 460 | 90 | 460 | 465 |
|  | Particle size distribution (%) | 32 | 33 | 18 | 21 | 31 | 29 | 33 | 33 |
|  | Reactivity 1 (%) | 98 | 90 | 94 | 93 | 75 | 99 | — | 82 |
|  | Reactivity 2 (%) | — | — | — | — | — | — | — | — |
|  | Weight average molecular weight | 58000 | 61000 | 66000 | 71000 | 49000 | 51000 | 51000 | 70000 |
|  | Mechanical stability | Excellent | Bad | Excellent | Excellent | Good | Bad | Excellent | Excellent |
|  | Coating film-drying property on inclined surface | Bad | — | Bad | Bad | Bad | — | Bad | Bad |
|  | Vibration damping property (loss coefficient) 20° C. | 0.077 | — | 0.061 | 0.067 | 0.069 | — | 0.066 | 0.071 |
|  | 40° C. | 0.121 | — | 0.123 | 0.120 | 0.110 | — | 0.119 | 0.120 |
|  | 60° C. | 0.012 | — | 0.020 | 0.015 | 0.011 | — | 0.013 | 0.019 |
|  | Total loss coefficients | 0.210 | — | 0.204 | 0.202 | 0.190 | — | 0.198 | 0.210 |

Then, emulsion for vibration damping materials (2) of the present invention, including acrylic emulsion particles each having a core part and a shell part, were tested. Emulsions which do not belong to the emulsion for vibration damping materials (2) of the present invention but belong to the emulsion for vibration damping materials (1) of the present invention are also shown as the Example.

Production of Emulsions

EXAMPLE 28

A polymerization vessel equipped with a stirrer, a reflux condenser, a thermometer, a nitrogen inlet tube and a dropping funnel was filled with deionized water 339 parts. Then, the internal temperature was increased to 75° C. under stirring and nitrogen flow. The dropping funnel was filled with a monomer emulsion at the first stage, composed of styrene 275 parts, 2-ethylhexyl acrylate 135.0 parts, acrylic acid 5.0 parts, t-dodecylmercaptan 2.0 parts, a previously adjusted 20% aqueous solution of NEWCOL 707SN (trade name, product of Nippon Nyukazai Co., Ltd., polyoxyethylene polycyclic phenyl ether sodium sulfate (ethylene oxide 7 mol adduct) 72.0 parts and deionized water 66.0 parts. While the internal temperature of the polymerization vessel was maintained at 75° C., the above-mentioned monomer emulsion 27.0 parts and a 5% aqueous solution of potassium persulfate 5 parts and a 22% aqueous solution of sodium hydrogen sulfite 10 parts were added, thereby being subjected to initial polymerization. Forty minutes later, while the inside of the reaction system was maintained at 80° C., the rest of the monomer emulsion was uniformly added dropwise for 90 minutes. Simultaneously, a 5% aqueous solution of potassium persulfate 35 parts and a 2% aqueous solution of sodium hydrogen sulfite 30 parts were uniformly added dropwise for 90 minutes. After completion of the dropwise addition, the temperature was maintained for 60 minutes, and the polymerization at the first stage was completed. The polymerization ratio of the reaction liquid 30 minutes later after completion of the dropwise addition was 95%.

Successively, a monomer emulsion at the second stage, composed of styrene 230.0 parts, butyl acrylate 350.0 parts, acrylic acid 5.0 parts, t-dodecylmercaptan 2.0 parts, 108.0 parts of a previously adjusted 20% aqueous solution of NEWCOL 707SN, and deionized water 98.0 parts was uniformly added dropwise at 80° C. for 120 minutes. Simultaneously, a 5% aqueous solution of potassium persulfate 60 parts and a 2% aqueous solution of sodium hydrogen sulfite 60 parts were uniformly added dropwise for 120 minutes. After completion of the dropwise addition, the temperature was maintained for 60 minutes, and the polymerization at the second stage was completed.

The obtained reaction liquid was cooled to a room temperature, and thereto, 2-dimethylethanolamine-16.7 parts was added. As a result, an emulsion for vibration damping materials 28 was obtained. The obtained aqueous resin dispersant was measured for solid content, pH, viscosity, MFT, average particle diameter, particle size distribution, reactivity, and weight average molecular weight by the above-mentioned methods, respectively. Table 5 shows the kind and the use amount of the polymerizable monomers at the first and second stages, and the use amount of the polymerizable monomers is represented by the proportion (% by weight) relative to the total amount of the polymerizable monomers used in the two stages.

EXAMPLES 29 TO 40

Emulsions for vibration damping materials 29 to 40 were prepared in the same manner as in Example 28, except that the constitutional components and the proportions thereof in the aqueous resin in Example 30 were changed to those shown in Tables 5 and 6. Tables 5 and 6 show a calculation Tg in each stage, the total Tg, and other physical properties of the emulsion. If the first stage and the second stage differ in the proportion of the polymerizable monomer components as in Example 36, the reaction time and the use amount were changed depending on the proportion of the polymerizable monomer components. For example, the dropwise addition time at the first stage was 70 minutes and that at the second stage was 140 minutes, and the use amount of the 20% aqueous solution of NEWCOL 707SN was 60.0 parts at the first stage and that was 120.0 parts at the second stage.

EXAMPLE 41

An emulsion for vibration damping materials 41 was prepared in the same manner as in Example 28, except that the deionized water charged into the polymerization vessel was changed from 339.0 parts to 833.0 parts; a 20% aqueous solution of NEWCOL 707SN 70.0 parts was charged; and the firstly charged monomer emulsion was changed from 27.0 parts to 134.8 parts. Table 6 shows a calculation Tg at each stage, the total Tg, and other physical properties of the emulsion.

EXAMPLE 42

An emulsion for vibration damping materials 42 was prepared in the same manner as in Example 28, except that the firstly charged monomer emulsion was changed from 27.0 parts to 2.7 parts. Table 6 shows a calculation Tg at each stage, the total Tg, and other physical properties of the emulsion.

EXAMPLES 43 TO 45

Emulsions for vibration damping materials 43 to 45 were prepared in the same manner as in Example 28, except that the constitutional components and the proportions thereof in the aqueous resin in Example 28 were changed to those shown in Tables 6 and 7. Tables 6 and 7 show a calculation Tg at each stage, the total Tg, and other physical properties of the emulsion. If the first stage and the second stage differ in the proportion of the polymerizable monomer components as in Example 36, the reaction time and the use amount were changed depending on the proportion of the polymerizable monomer components. For example, the dropwise addition time at the first stage was 70 minutes and that at the second stage was 140 minutes, and the use amount of the 20% aqueous solution of NEWCOL 707SN was 60.0 parts at the first stage and that was 120.0 parts at the second stage.

EXAMPLE 46

An emulsion for vibration damping materials 46 was prepared in the same manner as in Example 28, except that the reaction time for the initial polymerization was changed from 40 minutes to 20 minutes, the reaction time at the first stage was changed from 90 minutes to 60 minutes, the maturing time after completion of the dropwise addition was changed from 60 minutes to 30 minutes, and the reaction time at the second stage was changed from 120 minutes to 100 minutes. Table 7 shows a calculation Tg at each stage, the total Tg, and other physical properties of the emulsion.

EXAMPLE 47

An emulsion for vibration damping materials 47 was prepared in the same manner as in Example 28, except that the monomer emulsion 555.0 parts and simultaneously a 5% aqueous solution of potassium persulfate 40.0 parts, and a 2% aqueous solution of sodium hydrogen sulfite 40.0 parts were uniformly added dropwise for 90 minutes at a temperature inside the reaction system of 80° C. without adding the monomer emulsion 27.0 parts, the 5% aqueous solution of potassium persulfate 5 parts, and the 2% aqueous solution of sodium hydrogen sulfite 10.0 parts into the polymerization vessel at an internal temperature of 75° C. Table 7 shows a calculation Tg at each stage, the total Tg, and other physical properties of the emulsion.

EXAMPLE 48

An emulsion for vibration damping materials 48 was prepared in the same manner as in Example 28, except that sodium hydrogen sulfite was not used. Table 7 shows a calculation Tg at each stage, the total Tg, and other physical properties of the emulsion.

EXAMPLE 49

A comparative emulsion for vibration damping materials 7 was prepared in the same manner as in Example 28, except that styrene was not contained in the monomer component. Table 7 shows a calculation Tg at each stage, the total Tg, and other physical properties of the emulsion.

EXAMPLE 50

A polymerization vessel equipped with a stirrer, a reflux condenser, a thermometer, a nitrogen inlet tube and a dropping funnel was filled with deionized water 339.0 parts. Then, the internal temperature was increased to 75° C. under stirring and nitrogen flow. The dropping funnel was filled with a monomer emulsion composed of styrene 450.0 parts, 2-ethylhexyl acrylate 190.0 parts, butylacrylate 350.0 parts, acrylic acid 10.0 parts, t-dodecylmercaptan 5.0 parts, a previously adjusted 20% aqueous solution of NEWCOL 707SN 180 parts, and deionized water 164.0 parts. While the internal temperature of the polymerization vessel was maintained at 75° C., the above-mentioned monomer emulsion 27.0 parts and a 5% aqueous solution of potassium persulfate 5 parts and a 2% aqueous solution of sodium hydrogen sulfite 10 parts were added, thereby being subjected to initial polymerization. Forty minutes later, while the inside of the reaction system was maintained at 80° C., the rest of the monomer emulsion was uniformly added dropwise for 210 minutes. Simultaneously, a 5% aqueous solution of potassium persulfate 95 parts and a 2% aqueous solution of sodium hydrogen sulfite 90 parts were uniformly added dropwise for 210 minutes. After completion of the dropwise addition, the temperature was maintained for 60 minutes, and the polymerization was completed.

The obtained reaction liquid was cooled to a room temperature, and thereto, 2-dimethylethanolamine 16.7 parts was added. As a result, a comparative emulsion of vibration damping materials 8 was obtained. The obtained aqueous resin dispersant was measured for solid content, pH, viscosity, MFT, average particle diameter, particle size distribution, reactivity, and weight average molecular weight by the above-mentioned methods, respectively. Table 7 shows the kind and the use amount of the polymerizable monomers at the first and second stages, and the use amount of the polymerizable monomers is represented by the proportion (% by weight) relative to 100 parts by weight of the total amount of the polymerizable monomers used in the two stages.

Preparation of Vibration Damping Composition

Vibration damping compositions were prepared using the emulsions for vibration damping materials obtained in Examples 28 to 50 at the following proportions, and evaluated for mechanical stability, low-temperature storage stability, appearance of coating film, and vibration damping property. Tables 5 and 6 show the results.

| Acrylic copolymer emulsion | 359 parts |
| Calcium carbonate NN#200*1 | 620 parts |
| Dispersant AQUALIC DL-40S*2 | 6 parts |
| Thickener ACRYSET WR-650*3 | 4 parts |

-continued

| Antifoaming agent NOPCO 8034L*4 | 1 part |
| Foaming agent F-30*5 | 6 parts |

The above-mentioned *1 to *5 are the same as those mentioned above.

TABLE 5

|  |  | Example |  |  |  |  |  |  |  |
|---|---|---|---|---|---|---|---|---|---|
|  |  | 28 | 29 | 30 | 31 | 32 | 33 | 34 | 35 |
| 1st stage (unit:part) | 2EHA | 13.5 | 13.5 | 13.5 | 13.5 | 13.5 | 13.5 | 13.5 | 16.0 |
|  | St | 27.5 | 22.5 | 27.5 | 27.5 | 27.5 | 27.5 | 17.0 | 34.0 |
|  | MMA | — | 5.0 | — | — | — | — | 14.0 | — |
|  | BA | — | — | — | — | — | — | — | — |
|  | AA | 0.5 | 0.5 | 0.5 | 0.5 | 0.5 | 0.5 | — | 0.5 |
|  | MAA | — | — | — | — | — | — | 1.0 | — |
|  | n-BMA | — | — | — | — | — | — | — | — |
|  | t-DM | 0.2 | 0.1 | 0.2 | 0.2 | 0.2 | 0.1 | 0.2 | 0.1 |
|  | Total | 41.7 | 41.7 | 41.7 | 41.7 | 41.7 | 41.7 | 45.7 | 50.7 |
| 2nd stage (unit:part) | 2EHA | — | — | 35.0 | 35.0 | 35.0 | — | 5.0 | 21.0 |
|  | St | 23.0 | 18.0 | 23.0 | 23.0 | 23.0 | 23.0 | 17.5 | 28.0 |
|  | MMA | — | 5.0 | — | — | — | — | 6.0 | — |
|  | BA | 35.0 | 35.0 | — | — | — | 35.0 | 25.0 | — |
|  | AA | 0.5 | 0.5 | 0.5 | 0.5 | 0.5 | 0.5 | — | 0.5 |
|  | MAA | — | — | — | — | — | — | 1.0 | — |
|  | n-BMA | — | — | — | — | — | — | — | — |
|  | GMA | — | — | — | — | — | — | — | — |
|  | HEMA | — | — | — | — | — | — | — | — |
|  | t-DM | 0.2 | 0.1 | 0.2 | 0.2 | 0.2 | 0.2 | 0.2 | 0.1 |
|  | Total | 58.7 | 58.7 | 58.7 | 58.7 | 58.7 | 58.7 | 54.7 | 49.7 |
| Total of 1st stage and 2nd stage (unit:part) | 2EHA | 13.5 | 13.5 | 48.5 | 48.5 | 48.5 | 13.5 | 13.5 | 37.0 |
|  | St | 50.5 | 40.5 | 50.5 | 50.5 | 50.5 | 50.5 | 34.5 | 62.0 |
|  | MMA | — | 10.0 | — | — | — | — | 20.0 | — |
|  | BA | 35.0 | 35.0 | — | — | — | 35.0 | 30.0 | — |
|  | AA | 1.0 | 1.0 | 1.0 | 1.0 | 1.0 | 1.0 | — | 1.0 |
|  | n-BMA | — | — | — | — | — | — | — | — |
|  | GMA | — | — | — | — | — | — | — | — |
|  | HEMA | — | — | — | — | — | — | — | — |
|  | t-DM | 0.4 | 0.2 | 0.4 | 0.4 | 0.4 | 0.3 | 0.4 | 0.2 |
|  | Subtotal | 100.4 | 100.4 | 100.4 | 100.4 | 100.4 | 100.4 | 100.4 | 100.4 |
|  | Used emulsifier | A | A | A | B | C | D | A | A |
|  | Use amount (%) | 3.6 | 3.6 | 3.6 | 3.6 | 3.6 | 3.6 | 3.6 | 3.6 |
| Calculation Tg | 1st stage | 20 | 20 | 20 | 20 | 20 | 20 | 27 | 22 |
|  | 2nd stage | −12 | −12 | −25 | −25 | −25 | −12 | −7 | 2 |
|  | Total Tg | 0 | 1 | −8 | −8 | −8 | 0 | 9 | 12 |
|  | Δ Tg | 32 | 32 | 45 | 45 | 45 | 32 | 34 | 20 |
| Characteristic value | NV (%) | 54.7 | 55.0 | 54.6 | 54.7 | 54.8 | 54.8 | 54.9 | 54.8 |
|  | pH | 8.2 | 8.0 | 7.9 | 8.2 | 8.0 | 8.1 | 8.2 | 8.1 |
|  | Viscosity (mPa·s) | 250 | 350 | 240 | 400 | 360 | 210 | 400 | 500 |
|  | MFT (° C.) | 7 | 8 | 11 | 8 | 7 | 10 | 9 | 10 |
|  | Average particle diameter (nm) | 230 | 240 | 280 | 300 | 310 | 240 | 260 | 290 |
|  | Particle size distribution (%) | 11 | 15 | 8 | 20 | 7 | 16 | 13 | 18 |
|  | Reactivity 1 (%) | 92 | 93 | 96 | 90 | 94 | 97 | 96 | 95 |
|  | Reactivity 2 (%) | 95 | 98 | 94 | 94 | 93 | 96 | 99 | 92 |
|  | Weight average molecular weight | 85000 | 105000 | 90000 | 88000 | 85000 | 90000 | 80000 | 108000 |
|  | Mechanical stability | Excellent | Good | Excellent | Excellent | Good | Excellent | Good | Excellent |
|  | Low-temperature storage stability | Good | Good | Good | Good | Good | Good | Good | Good |
|  | Appearance of coating film | Excellent | Excellent | Excellent | Excellent | Excellent | Excellent | Excellent | Excellent |
| Vibration damping property (loss coefficient) | 20° C. | 0.073 | 0.068 | 0.073 | 0.076 | 0.075 | 0.067 | 0.077 | 0.016 |
|  | 40° C. | 0.139 | 0.134 | 0.078 | 0.079 | 0.076 | 0.136 | 0.143 | 0.120 |
|  | 60° C. | 0.069 | 0.055 | 0.060 | 0.063 | 0.061 | 0.040 | 0.065 | 0.079 |
|  | Total loss coefficients | 0.281 | 0.257 | 0.211 | 0.218 | 0.212 | 0.243 | 0.285 | 0.215 |

TABLE 6

|  |  | Example | | | | | | | |
|---|---|---|---|---|---|---|---|---|---|
|  |  | 36 | 37 | 38 | 39 | 40 | 41 | 42 | 43 |
| 1st stage (unit:part) | 2EHA | 13.5 | 12.0 | 35.0 | 7.0 | 13.5 | 13.5 | 13.5 | 4.0 |
|  | St | 27.5 | 20.0 | 23.0 | 18.0 | 27.5 | 27.5 | 22.5 | 35.0 |
|  | MMA | — | — | — | 5.0 | — | — | 5.0 | — |
|  | BA | — | — | — | — | — | — | — | — |
|  | AA | 0.5 | 1.0 | 1.0 | 0.5 | 0.5 | .5 | .5 | 1.0 |
|  | MAA | — | — | — | — | — | — | — | — |
|  | n-BMA | — | — | — | 15.0 | — | — | — | — |
|  | t-DM | 0.2 | 0.1 | 0.2 | 0.2 | 0.2 | 0.2 | 0.2 | 0.2 |
|  | Total | 41.7 | 33.2 | 59.2 | 45.7 | 41.7 | 41.7 | 41.7 | 40.2 |
| 2nd stage (unit:part) | 2EHA | 32.0 | — | 13.0 | — | — | 35.0 | — | 16.5 |
|  | St | 22.0 | 29.0 | 27.5 | 8.0 | 23.0 | 23.0 | 13.0 | 43.0 |
|  | MMA | — | — | — | 5.0 | — | — | 10.0 | — |
|  | BA | — | 34.5 | — | 26.0 | 35.0 | — | 35.0 | — |
|  | AA | 0.5 | 0.5 | 0.5 | 0.5 | 0.5 | 0.5 | 0.5 | 0.5 |
|  | MAA | — | — | — | — | — | — | — | — |
|  | n-BMA | — | — | — | 15.0 | — | — | — | — |
|  | GMA | 1.0 | — | — | — | — | — | — | — |
|  | HEMA | 3.0 | 3.0 | — | — | — | — | — | — |
|  | t-DM | 0.1 | 0.1 | 0.2 | 0.2 | 0.2 | 0.2 | 0.2 | 0.2 |
|  | Total | 58.7 | 67.2 | 41.2 | 54.7 | 58.7 | 58.7 | 58.7 | 60.2 |
| Total of 1st stage and 2nd stage (unit:part) | 2EHA | 45.5 | 12.0 | 48.5 | 7.0 | 13.5 | 48.5 | 13.5 | 20.5 |
|  | St | 49.5 | 49.0 | 50.5 | 26.0 | 50.5 | 50.5 | 35.5 | 78.0 |
|  | MMA | — | — | — | 10.0 | — | — | 15.0 | — |
|  | BA | — | 35.0 | — | 26.0 | 35.0 | — | 35.0 | — |
|  | AA | 1.0 | 1.5 | 1.5 | 1.0 | 1.0 | 1.0 | 1.0 | 1.5 |
|  | n-BMA | — | — | — | 30.0 | — | — | — | — |
|  | GMA | 1.0 | — | — | — | — | — | — | — |
|  | HEMA | 3.0 | 3.0 | — | — | — | — | — | — |
|  | t-DM | 0.3 | 0.2 | 0.4 | 0.4 | 0.4 | 0.4 | 0.4 | 0.4 |
|  | Subtotal | 100.4 | 100.4 | 100.4 | 100.4 | 100.4 | 100.4 | 100.4 | 100.4 |
|  | Used emulsifier | A | F | A | A | A + F | A | A | A |
|  | Use amount (%) | 3.6 | 3.6 | 3.6 | 3.6 | 2.4 + 1.2 | 3.6 | 3.6 | 3.6 |
| Calculation Tg | 1st stage | 20 | 13 | −24 | 20 | 20 | 20 | 20 | 71 |
|  | 2nd stage | −19 | −2 | 22 | −12 | −12 | −25 | −12 | 31 |
|  | Total Tg | −4 | 2 | −7 | 0 | 0 | −8 | 1 | 45 |
|  | Δ Tg | 39 | 15 | 46 | 32 | 32 | 45 | 32 | 40 |
| Characteristic value | NV (%) | 54.7 | 54.9 | 54.8 | 54.7 | 54.9 | 42.8 | 54.6 | 54.5 |
|  | pH | 8.3 | 7.9 | 7.7 | 8.2 | 8.1 | 8.3 | 8.2 | 7.7 |
|  | Viscosity (mPa·s) | 190 | 420 | 350 | 420 | 480 | 760 | 170 | 430 |
|  | MFT (° C.) | 12 | 10 | 7 | 6 | 7 | 0 | 7 | 55 |
|  | Average particle diameter (nm) | 280 | 310 | 280 | 300 | 250 | 80 | 400 | 340 |
|  | Particle size distribution (%) | 10 | 25 | 19 | 24 | 6 | 17 | 7 | 20 |
|  | Reactivity 1 (%) | 96 | 93 | 95 | 94 | 97 | 99 | 87 | 90 |
|  | Reactivity 2 (%) | 93 | 92 | 90 | 90 | 97 | 94 | 80 | 81 |
|  | Weight average molecular weight | 137000 | 104000 | 89000 | 96000 | 89000 | 93000 | 95000 | 91000 |
|  | Mechanical stability | Good | Good | Good | Excellent | Average | Bad | Good | Bad |
|  | Low-temperature storage stability | Good | Good | Good | Excellent | Average | Good | Bad | Average |
|  | Appearance of coating film | Excellent | Excellent | Excellent | Excellent | Good | Good | Good | Good |
|  | Vibration damping property (loss coefficient) 20° C. | 0.050 | 0.089 | 0.065 | 0.068 | 0.076 | 0.070 | 0.058 | — |
|  | 40° C. | 0.137 | 0.122 | 0.132 | 0.138 | 0.138 | 0.071 | 0.119 | — |
|  | 60° C. | 0.040 | 0.028 | 0.038 | 0.035 | 0.062 | 0.055 | 0.040 | 0.020 |
|  | Total loss coefficients | 0.227 | 0.239 | 0.235 | 0.241 | 0.276 | 0.196 | 0.217 | — |

TABLE 7

|  |  | Example | | | | | | |
|---|---|---|---|---|---|---|---|---|
|  |  | 44 | 45 | 46 | 47 | 48 | 49 | 50 |
| 1st stage (unit:part) | 2EHA | 3.0 | 23.0 | 13.5 | 13.5 | 13.5 | 4.0 | 19.0 |
|  | St | 36.0 | 12.0 | 27.5 | 27.5 | 27.5 | — | 45.0 |
|  | MMA | — | — | — | — | — | 35.0 | — |
|  | BA | — | — | — | — | — | — | 35.0 |
|  | AA | 1.0 | 0.5 | 0.5 | 0.5 | 0.5 | 1.0 | 1.0 |
|  | MAA | — | — | — | — | — | — | — |
|  | n-BMA | — | — | — | — | — | — | — |
|  | t-DM | 0.2 | 0.2 | 0.2 | 0.2 | 0.2 | 0.2 | 0.5 |
|  | Total | 40.2 | 35.7 | 41.7 | 41.7 | 41.7 | 40.2 | 100.5 |

TABLE 7-continued

|  |  | Example | | | | | | |
|---|---|---|---|---|---|---|---|---|
|  |  | 44 | 45 | 46 | 47 | 48 | 49 | 50 |
| 2nd stage (unit:part) | 2EHA | 36.0 | — | 35.0 | 35.0 | 35.0 | 21.5 | — |
|  | St | — | 16.0 | 23.0 | 23.0 | 23.0 | — | — |
|  | MMA | 23.0 | — | — | — | — | 38.0 | — |
|  | BA | — | 48.0 | — | — | — | — | — |
|  | AA | 1.0 | 0.5 | 0.5 | 0.5 | 0.5 | 0.5 | — |
|  | MAA | — | — | — | — | — | — | — |
|  | n-BMA | — | — | — | — | — | — | — |
|  | GMA | — | — | — | — | — | — | — |
|  | HEMA | — | — | — | — | — | — | — |
|  | t-DM | 0.2 | 0.2 | 0.2 | 0.2 | 0.2 | 0.2 | — |
|  | Total | 60.2 | 64.7 | 58.7 | 58.7 | 58.7 | 60.2 | — |
| Total of 1st stage and 2nd stage (unit:part) | 2EHA | 39.0 | 23.0 | 48.5 | 48.5 | 48.5 | 25.5 | 19.0 |
|  | St | 36.0 | 28.0 | 50.5 | 50.5 | 50.5 | — | 45.0 |
|  | MMA | 23.0 | — | — | — | — | 73.0 | — |
|  | BA | — | 48.0 | — | — | — | — | 35.0 |
|  | AA | 2.0 | 1.0 | 1.0 | 1.0 | 1.0 | 1.5 | 1.0 |
|  | n-BMA | — | — | — | — | — | — | — |
|  | GMA | — | — | — | — | — | — | — |
|  | HEMA | — | — | — | — | — | — | — |
|  | t-DM | 0.4 | 0.4 | 0.4 | 0.4 | 0.4 | 0.4 | 0.5 |
|  | Subtotal | 100.4 | 100.4 | 100.4 | 100.4 | 100.4 | 100.4 | 100.5 |
|  | Used emulsifier | A | A | A | A | A | A | A |
|  | Use amount (%) | 3.6 | 3.6 | 3.6 | 3.6 | 3.6 | 3.6 | 3.6 |
| Calculation Tg | 1st stage | 78 | −1 | 20 | 20 | 20 | 75 | −9 |
|  | 2nd stage | −23 | −47 | −25 | −25 | −25 | 17 | — |
|  | Total Tg | 9 | −30 | −8 | −8 | −8 | 37 | −9 |
|  | Δ Tg | 101 | 46 | 45 | 45 | 45 | 58 | — |
| Characteristic value | NV (%) | 54.8 | 54.6 | 54.5 | 54.5 | 54.3 | 55.1 | 54.7 |
|  | pH | 7.5 | 8.2 | 8.2 | 8.2 | 8.2 | 7.8 | 8.1 |
|  | Viscosity (mPa · s) | 250 | 660 | 410 | 150 | 400 | 330 | 290 |
|  | MFT (° C.) | 15 | <0 | 3 | 1 | 12 | 48 | 4 |
|  | Average particle diameter (nm) | 290 | 300 | 270 | 240 | 420 | 280 | 290 |
|  | Particle size distribution (%) | 10 | 30 | 42 | 45 | 32 | 28 | 11 |
|  | Reactivity 1 (%) | 94 | 90 | 88 | — | 86 | 99 | 91 |
|  | Reactivity 2 (%) | 92 | 90 | 75 | 80 | 75 | 99 | — |
|  | Weight average molecular weight | 96000 | 92000 | 113000 | 102000 | 111000 | 88000 | 90000 |
|  | Mechanical stability | Average | Average | Average | Good | Good | Bad | Average |
|  | Low-temperature storage stability | Average | Good | Bad | Bad | Bad | Bad | Good |
|  | Appearance of coating film | Good | Good | Good | Average | Good | Good | Good |
| Vibration damping property (loss coefficient) | 20° C. | 0.010 | — | 0.030 | 0.076 | 0.071 | — | 0.027 |
|  | 40° C. | — | — | 0.138 | 0.077 | 0.071 | — | 0.078 |
|  | 60° C. | — | — | 0.021 | 0.049 | 0.054 | 0.018 | 0.048 |
|  | Total loss coefficients | — | — | 0.189 | 0.202 | 0.196 | — | 0.153 |

In Tables 5 to 7, t-DM represents t-dodecyl mercaptan. Other abbreviations represent the same abbreviations as those mentioned in the above-mentioned Tg evaluation method. The emulsifiers A to F in Tables 5 to 7 are as follows.

A: NEWCOL 707SN (trade name, product of Nippon Nyukazai Co., Ltd., polyoxyethylene polycyclic phenyl ether sodium sulfate, ethylene oxide 7 mol adduct)
B: ABEX-26S (trade name, product of Rhodia Nikka Co., Ltd., polyoxyethylene alkyl phenyl ether sodium sulfate, ethylene oxide 26 mol adduct)
C: ADEKA-REASOAP SR-30 (trade name, product of ADEKA Corp., allyloxymethyl alkoxy ethyl polyoxyethylene sulfate, ethylene oxide 30 mol adduct)
D: LATEMUL WX (trade name, product of Kao Corp., polyoxyethylene oleyl ether sodium sulfate, ethylene oxide 23 mol adduct)
E: LATEMUL 118B (trade name, product of Kao Corp., polyoxyethylene alkyl ether sodium sulfate, ethylene oxide 18 mol adduct)
F: EMULGEN 1118S (trade name, product of Kao Corp., polyoxyethylene alkyl ether, ethylene oxide 18 mol adduct)

The invention claimed is:

1. An emulsion for vibration damping materials, comprising an acrylic emulsion obtainable by emulsion polymerization of a monomer component,
wherein the emulsion is obtainable by emulsion polymerization using an anionic emulsifier and/or a reactive emulsifier, and
particles of the acrylic emulsion have an average diameter of 100 to 450 nm, and the particles of the acrylic emulsion have a particle size distribution of 30% or less, where particle size distribution is defined as a value obtained by dividing a standard deviation by a volume average particle diameter thereof (standard deviation/volume average particle diameter×100),
wherein the monomer component forming the particles of the acrylic emulsion contains 30 to 70% by weight of a styrene monomer relative to 100% by weight of the entire monomer component for forming the particles of the acrylic emulsion and wherein the total amount of acrylic hard monomer in the monomer component for forming the particles of the acrylic emulsion is 10% by weight or less relative to 100% by weight of the entire monomer component for forming the particles of the acrylic emulsion, wherein the acrylic hard monomer is methacrylic acid ester(s) each of which differs from all of the other acrylic monomers of the particles of the acrylic emulsion and wherein a homopolymer of each methacrylic acid ester present has a Tg that is 30° C. or more higher than the Tg of a polymer from all of the acrylic monomers other than the methacrylic acid ester(s), and wherein the particles of the acrylic emulsion each have a core part and a shell part and wherein the total amount of polymerized styrene monomer is 30 to 70% by weight of said particles of the acrylic emulsion having a core part and a shell part.

2. The emulsion for vibration damping materials according to claim 1,
wherein the emulsion for vibration damping materials is obtainable by emulsion polymerization using an anionic emulsifier,
the anionic emulsifier is a sulfate compound or a succinate compound, and
the sulfate compound contains at least one group selected from the group consisting of aliphatic alkyl groups containing 8 or more carbon atoms, oleyl groups, alkyl phenyl groups, styryl groups, and benzyl groups.

3. The emulsion for vibration damping materials according to claim 2, wherein the particles of the acrylic emulsion have a glass transition temperature of −20 to 30° C.

4. The emulsion for vibration damping materials according to claim 2, wherein the monomer component comprises an unsaturated carboxylic acid monomer.

5. The emulsion for vibration damping materials according to claim 2,
wherein the anionic emulsifier is at least one selected from the group consisting of polyoxyalkylene alkyl ether sulfate, polyoxyalkylene oleyl ether sodium sulfate, polyoxyalkylene alkylphenyl ether sulfate, alkyl diphenyl ether disulfonate, polyoxyalkylene (mono, di, tri)styryl phenyl ether sulfate, polyoxyalkylene (mono, di, tri) benzyl phenyl ether sulfate, and alkenyl disuccinate.

6. The emulsion for vibration damping materials according to claim 5, wherein the particles of the acrylic emulsion have a glass transition temperature of −20 to 30° C.

7. The emulsion for vibration damping materials according to claim 5, wherein the monomer component comprises an unsaturated carboxylic acid monomer.

8. The emulsion for vibration damping materials according to claim 1,
wherein the particles of the acrylic emulsion have a glass transition temperature of −20 to 30° C.

9. The emulsion for vibration damping materials according to claim 8, wherein the monomer component comprises an unsaturated carboxylic acid monomer.

10. The emulsion for vibration damping materials according to claim 1,
wherein the monomer component comprises an unsaturated carboxylic acid monomer.

11. The emulsion for vibration damping materials according to claim 1, wherein the monomer component forming the particles of the acrylic emulsion contains 10 to 60% by weight of butyl acrylate relative to 100% by weight of the monomer component or 20 to 50% by weight of 2-ethylhexyl acrylate relative to 100% by weight of the monomer component.

12. The emulsion for vibration damping materials according to claim 1, wherein the monomer component forming the particles of the acrylic emulsion contains 40 to 60% by weight of the styrene monomer.

13. The emulsion for vibration damping materials according to claim 1, wherein the particles of the acrylic emulsion each have the core part and the shell part containing said styrene monomer.

14. An emulsion for vibration damping materials, comprising particles of an acrylic emulsion each having a core part and a shell part,
wherein the particles of the acrylic emulsion are obtainable by polymerizing a monomer component including 30 to 70% by weight of a monomer having a Q value of 0.6 to 1.4 and an e value of −0.4 to −1.2 relative to 100% by weight of the entire monomer component for forming the particles of the acrylic emulsion, wherein the total amount of acrylic hard monomer in the monomer component for forming the particles of the acrylic emulsion is 10% by weight or less relative to 100% by weight of the entire monomer component for forming the particles of the acrylic emulsion, wherein the acrylic hard monomer is methacrylic acid ester(s) each of which differs from all of the other acrylic monomers of the particles of the acrylic emulsion and wherein a homopolymer of each methacrylic acid ester present has a Tg that is 30° C. or more higher than the Tg of a polymer from all of the acrylic monomers other than the methacrylic acid ester(s), the total amount of polymerized monomer having a Q value of 0.6 to 1.4 and an e value of −0.4 to −1.2 is 30 to 70% by weight of said particles of the acrylic emulsion having a core part and a shell part.

15. The emulsion for vibration damping materials according to claim 14,
wherein the particles of the acrylic emulsion have an average particle diameter of 100 to 450 nm.

16. The emulsion for vibration damping materials according to claim 15, wherein a monomer component forming the core part and a monomer component forming the shell part differ in a glass transition temperature by 10 to 60° C.

17. The emulsion for vibration damping materials according to claim 15, wherein a ratio by weight of the monomer component forming the core part to the monomer component forming the shell part is 20/80 to 70/30.

18. The emulsion for vibration damping materials according to claim 14,
wherein a monomer component forming the core part and a monomer component forming the shell part differ in a glass transition temperature by 10 to 60° C.

19. The emulsion for vibration damping materials according to claim 18, wherein a ratio by weight of the monomer component forming the core part to the monomer component forming the shell part is 20/80 to 70/30.

20. The emulsion for vibration damping materials according to claim 14,
wherein a ratio by weight of the monomer component forming the core part to the monomer component forming the shell part is 20/80 to 70/30.

21. The emulsion for vibration damping materials according to claim 14,
wherein the monomer forming the particles of the acrylic emulsion and having a Q value of 0.6 to 1.4 and an e value of −0.4 to −1.2 is a styrene monomer.

22. The emulsion for vibration damping materials according to claim 14, wherein the monomer component forming the particles of the acrylic emulsion includes butyl acrylate and/or 2-ethylhexyl acrylate.

23. The emulsion for vibration damping materials according to claim 14, wherein the particles of the acrylic emulsion has a particle size distribution of 30% or less, where particle size distribution is defined as a value obtained by dividing a standard deviation by a volume average particle diameter thereof (standard deviation/volume average particle diameter×100).

24. The emulsion for vibration damping materials according to claim 14, wherein both the core and shell contain said monomer having a Q value of 0.6 to 1.4 and an e value of −0.4 to −1.2.

* * * * *